United States Patent [19]
Sherman et al.

[11] Patent Number: 5,537,516
[45] Date of Patent: Jul. 16, 1996

[54] METHOD FOR CALIBRATING A COLOR PRINTER USING A SCANNER FOR COLOR MEASUREMENTS

[75] Inventors: Doron Sherman, Palo Alto; Yigal Accad, Millbrae; Eran Steinberg, San Francisco, all of Calif.

[73] Assignee: Electronics For Imaging, Inc., San Mateo, Calif.

[21] Appl. No.: 214,352

[22] Filed: Mar. 15, 1994

[51] Int. Cl.⁶ ................................................ G06K 15/00
[52] U.S. Cl. .......................... 395/109; 395/101; 395/131
[58] Field of Search .................................... 395/109, 101, 395/131; 358/504, 406, 500, 518

[56] References Cited

U.S. PATENT DOCUMENTS

| | | | |
|---|---|---|---|
| 3,876,824 | 4/1975 | Hipwell | 358/518 |
| 5,053,866 | 10/1991 | Johnson | 358/504 |
| 5,121,196 | 6/1992 | Hung | 358/504 |
| 5,157,506 | 10/1992 | Hannah | 358/298 |
| 5,271,096 | 12/1993 | Cook | 395/131 |
| 5,309,257 | 5/1994 | Bonino et al. | 358/518 |
| 5,313,291 | 5/1994 | Appel et al. | 395/109 |
| 5,339,176 | 8/1994 | Smilansky et al. | 358/504 |
| 5,363,318 | 11/1994 | McCauley | 358/519 |
| 5,416,613 | 5/1995 | Rolleston et al. | 358/518 |

*Primary Examiner*—Mark R. Powell
*Assistant Examiner*—Tracy M. Legree
*Attorney, Agent, or Firm*—Hecker & Harriman

[57] ABSTRACT

The present invention is a method for calibrating color reproduction devices such as printers and for stabilizing the print colors generated by a computer controlled color reproduction device. Further, the present invention acts to standardize the print colors produced across a family or series of color reproduction devices. It may be incorporated into a color management system used to produce consistent colors across a variety of reproduction devices. In the first embodiment of the present invention, an object scanning device and an object color reproduction device are used. In the second embodiment, an object densitometer is used as the measuring device to measure densities. In yet another embodiment, an object colorimeter is used as the measuring device to measure CIE values. The present invention enables generation of a set of calibration curves for correcting the color output of the color reproduction device. The calibration curves provide modification functions for each of the individual color print channels of the color reproduction device (e.g., CMYK). The calibration curves are used to alter the rendering of color reproductions, and thereby achieve a desired result. The calibration curves may be downloaded to a color management system to alter the rendering of color images, pages, documents, etc., and thereby achieve a desired result. The calibration curves may also be downloaded directly to the controller of the color reproduction device. The present invention further provides an improved method of measuring ink values using a subject scanner by defocusing or diffusing a target.

53 Claims, 14 Drawing Sheets

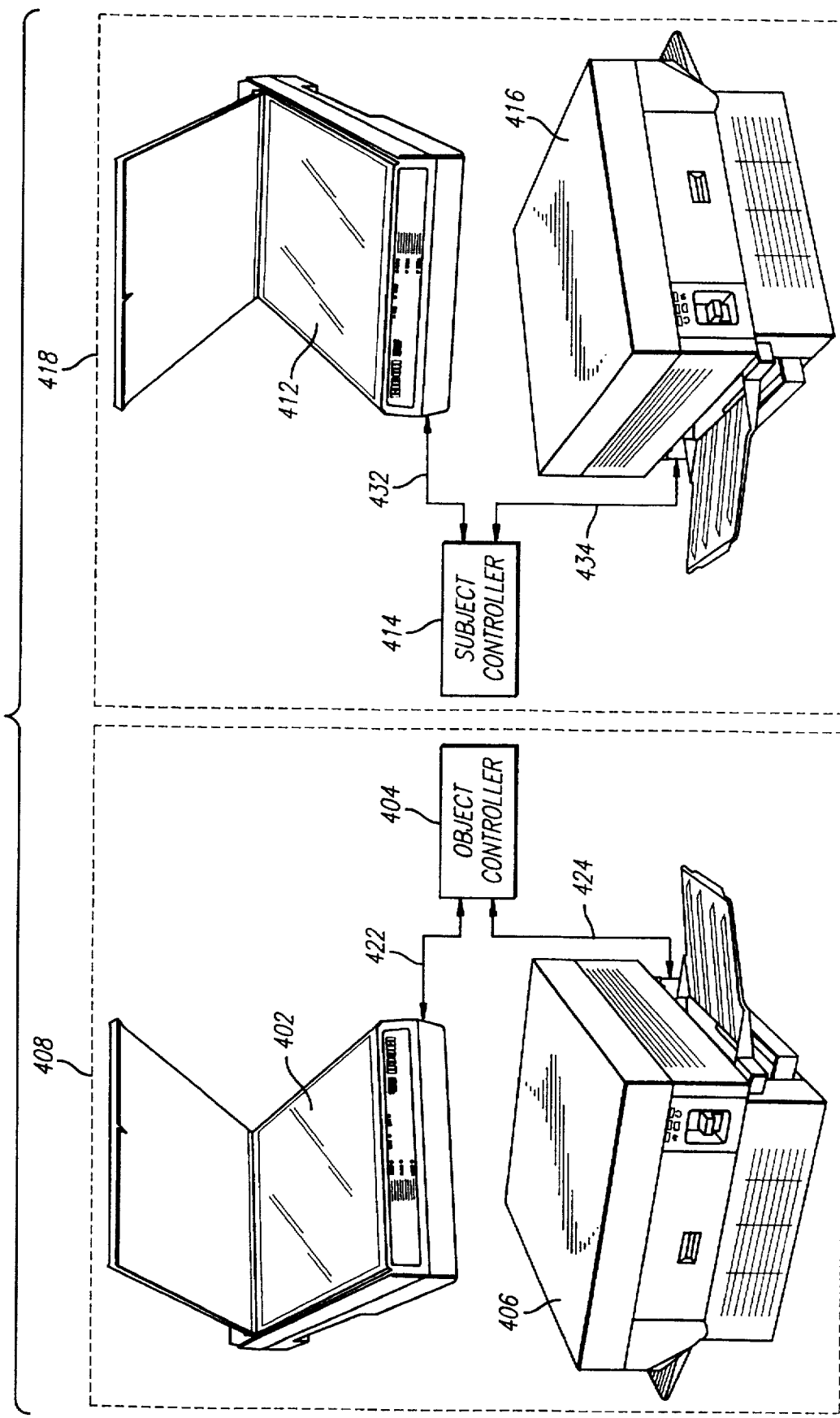

FIG. 5A
PRIOR ART
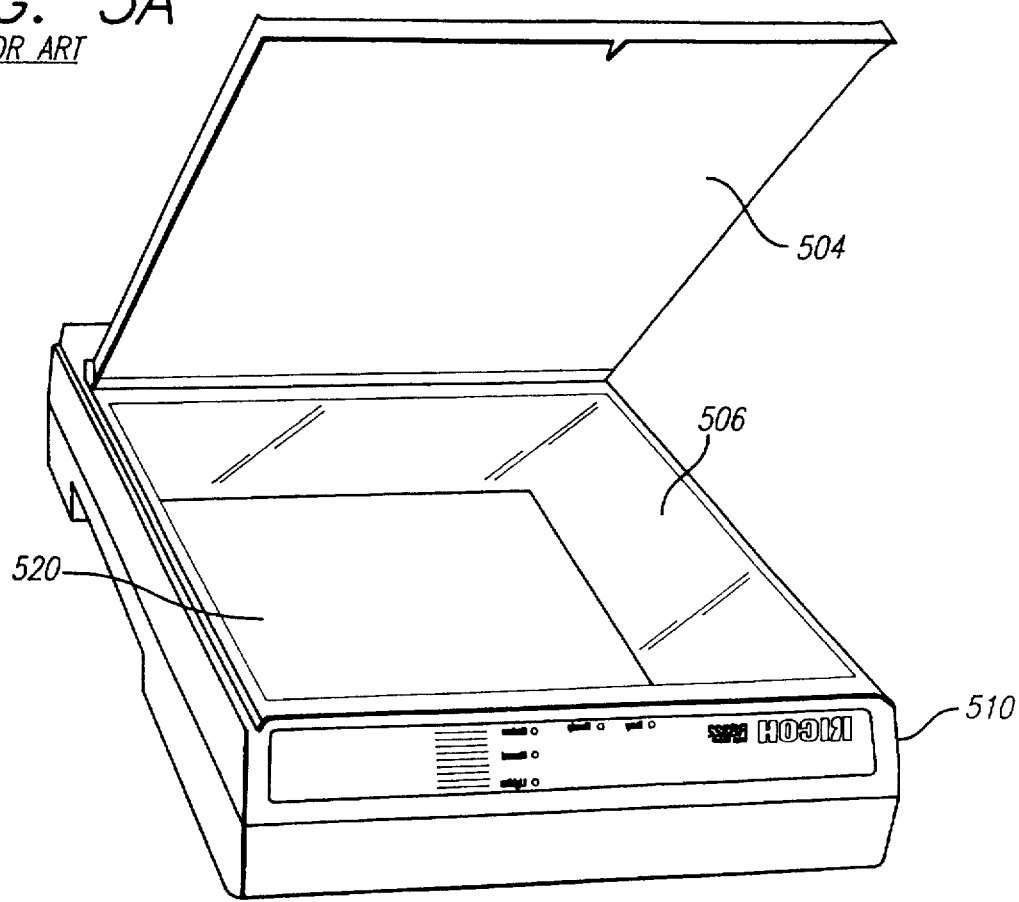
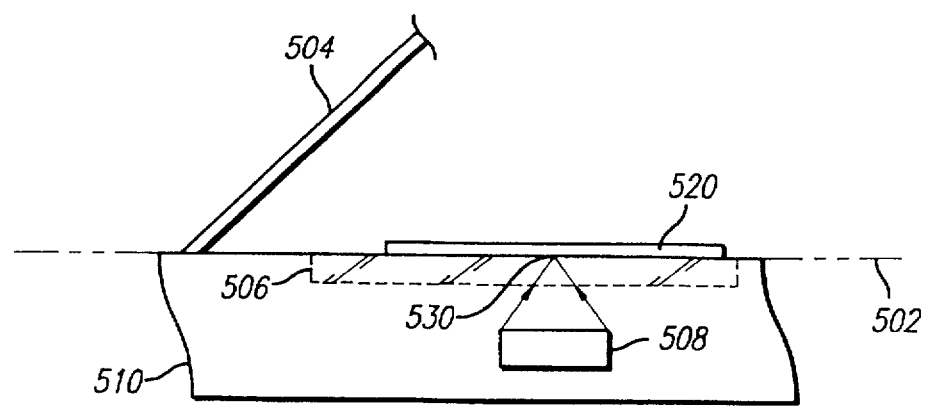
FIG. 5B
PRIOR ART

FIG. 6A
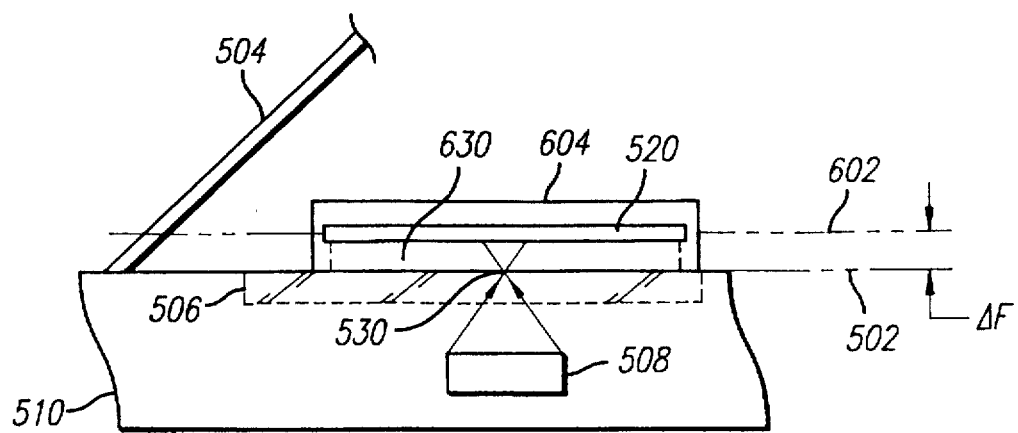
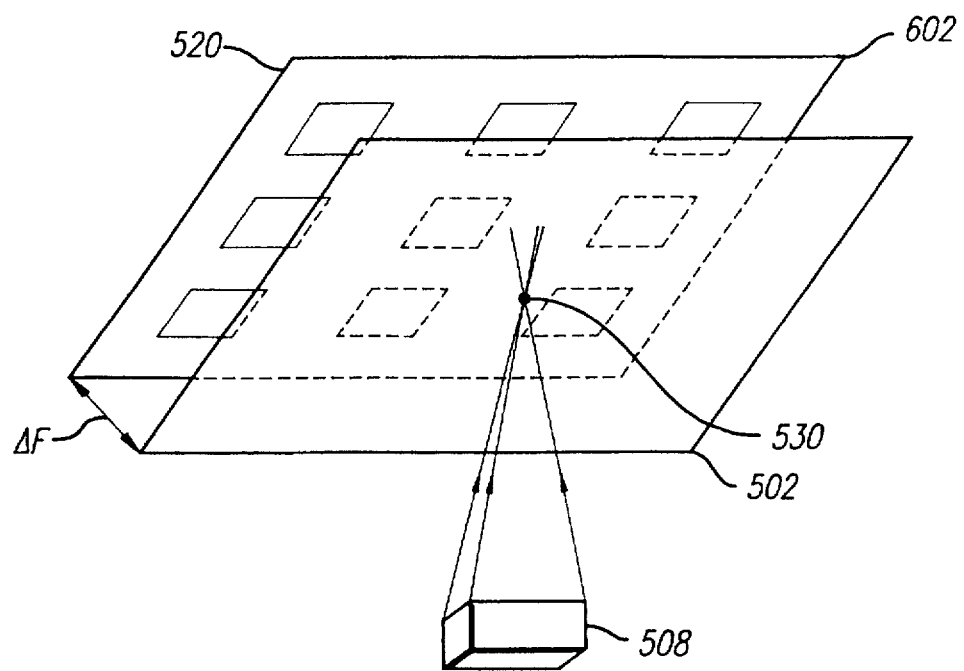
FIG. 6B
PRIOR ART

FIG. 13
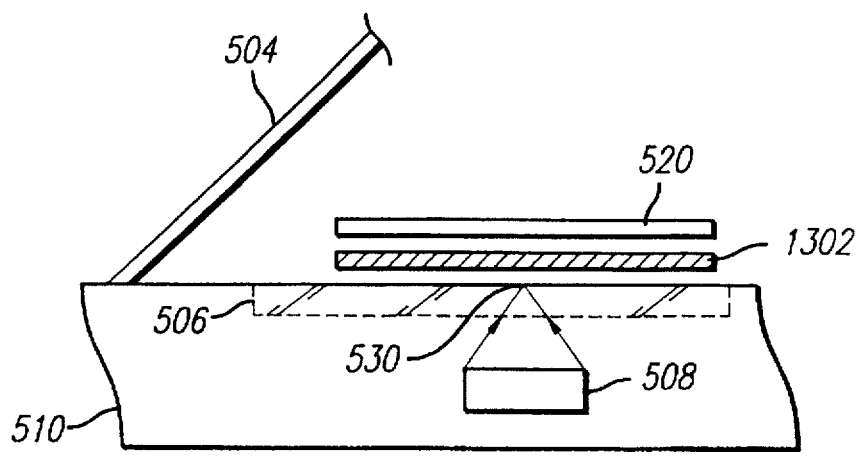
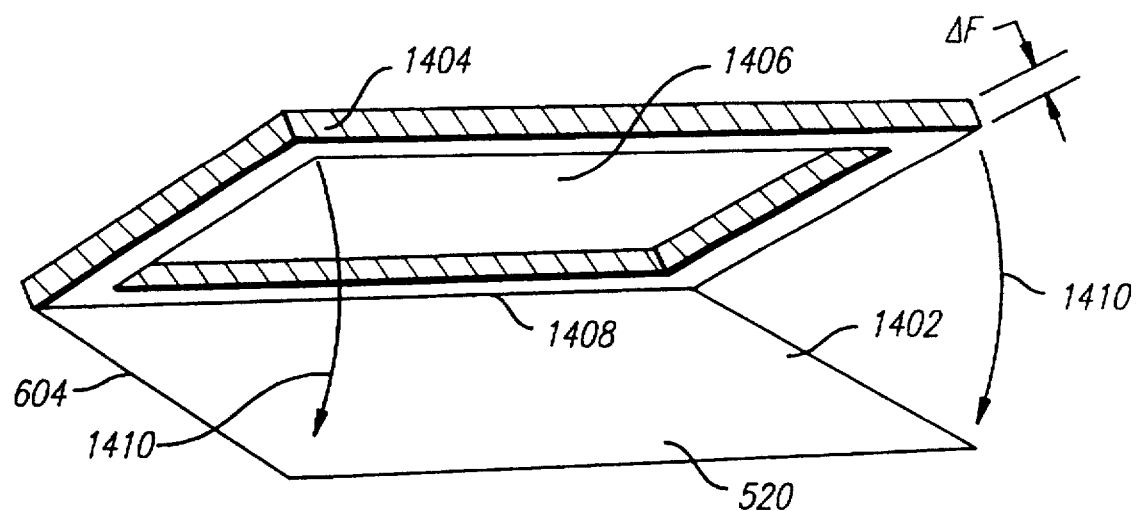
FIG. 14

METHOD FOR CALIBRATING A COLOR PRINTER USING A SCANNER FOR COLOR MEASUREMENTS

BACKGROUND OF THE INVENTION

1. Field of the Invention

The present invention relates to the field of calibrating color printers and measuring color information using scanners.

2. Background Art

Color Reproduction

In the field of color reproduction systems, it is commonly necessary to calibrate color reproduction devices such as printers and imagesetter/press combinations to make print colors output by the color reproduction devices conform to standards and to compensate for drift and other changes. Thus, calibration is required to fine tune the color response of the color reproduction device. In color reproduction systems that include both a color scanner and a color reproduction device, the scanner is typically used to provide input for the color reproduction device.

Color reproduction systems commonly utilize computers. As computing power increases and computer users become more sophisticated, the features found in "high-end" professional color reproduction systems are increasingly available to average computer users working on "the desktop." However, providing efficient and accurate color printing remains a problem because of numerous difficulties.

Printing devices typically apply three or four colorants such as cyan, magenta, yellow, and black inks. Colorants are inks or dyes used in printing. For printing both reflective prints and transparencies, the density of colorants is directly related to the quantity of ink laid down. The acronym CMYK refers to cyan, magenta, yellow, and black ink that are typically used in printing reflective prints. Transparencies are frequently printed using cyan, magenta, and yellow. Cyan, magenta, and yellow are also the terms used to describe three subtractive primaries. Because inks and dyes combine in a complicated way, CMY colorants behave differently from and approximately like the true subtractive primaries: cyan, magenta, and yellow. CMY is subsequently used herein to denote colorant values.

Various printers render color differently because the colorants that they use mix differently and have different spectral characteristics. In addition, colors vary between individual printers of the same type, and the colors produced by an individual printer vary with time.

A scanner is a device for converting pictures, artwork, documents, transparencies, and photographs into electronic form such as digital image data. The scanner captures an image by measuring colors reflected from or transmitted through an image at many points (or small areas) and assigning numerical values to the colors at these points. It is common in the art to use an RGB representation scheme for electronic image colors measured by a color scanner although some scanners subsequently convert the RGB values to CMYK values. A typical digital image comprises picture elements, also called pixels, that are arranged into rows and columns. These pixels together make up the image as stored in digital form and as displayed on a visual display. Each pixel of the digital image contains, among other information, the color information for that particular pixel. In the RGB scheme, the color information of each pixel is defined as having some quantity of each of the additive primary colors red (R), green (G), and blue (B). Scanners measure the color at each area, representing a pixel, of a print or transparency. Such scanners typically output RGB values.

Representation schemes other than RGB may be used. As is well-known in the art, color information may be represented by as few as three numbers at each pixel. The different means of representing color information use a different set of three numbers to represent colors. Because three-dimensional mathematical space may be defined by coordinate systems having three variables, the different means for describing color define different color spaces. Each color may be considered a point in color space where the particular variables used to define color indicate the coordinate system of the three-dimensional space.

Appearance values in appearance variable color spaces are defined as values produced by any reversible transformation of RGB. Appearance values include R, G, and B values. Other representation schemes that use appearance variable color spaces include the HSB scheme, the subtractive primary (cmy) scheme and colorimetric schemes. In the HSB scheme, the color information of each pixel is defined in quantities of hue, saturation, and brightness. The HSB appearance variables are hue, saturation, and brightness or brilliance, wherein the color of each pixel is represented by a point in the HSB color space. In the subtractive primary (cmy) scheme, the color information of each pixel is defined by the amount of the three subtractive primaries cyan (c), magenta (m), and yellow (y), which are typically not colorant amounts, as stated above. Colorimetric schemes for specifying color include use of the mathematical spaces CIELAB, CIELUV, CIEXYZ and xyY. The acronym CIE denotes the Commission Internationale de l'Eclairage, and the following three characters refer to the three coordinates used to define the color information.

Prior Art Calibration Using Densitometers, Colorimeters, and Scanners

In the prior art, a densitometer is commonly used in calibration of the output of color reproduction devices including printers. A densitometer measures the density of ink on paper. For calibrating a color reproduction device, the densitometer measures a scale of printed patches in each of the cyan-magenta-yellow-black (CMYK) print channels. The measured densities are compared with a corresponding scale of desired densities to obtain calibration curves. Calibration curves are modification functions that are used to alter the current print signals. The modified print signals are sent to the printer, thereby obtaining a scale of densities that conform to the desired scale.

A colorimeter may also be used to calibrate the output of a color reproduction device including a printer. A colorimeter measures the CIE values of color on a page, for example in CIEXYZ or CIELAB units. For calibration, the colorimeter rather than a densitometer measures a scale of printed patches in each of the cyan-magenta-yellow-black (CMYK) print channels. The measured CIE values are compared with a corresponding scale of desired values to obtain calibration curves.

A typical user of a desktop reproduction system likely has a scanner but may not have access to a densitometer. In another prior art system for performing printer calibration, a scanner is used rather than a densitometer. In such a prior art system, the scanner is used to scan a target and measures the densities of ink deposited on the target. The use of a scanner instead of a hand-held densitometer advantageously provides ease of use and speed for a user in measuring each patch of the target. While providing improved ease of use and speed for the user, a scanner is less accurate than a densitometer and has other disadvantages.

A disadvantage of using a scanner instead of a colorimeter or densitometer is that scanners typically use filters having spectral responses that are not optimized for measuring colorants as used in printing. Another disadvantage is that scanners operate on a sensitivity (linear) scale, not a density (logarithmic) scale. A further disadvantage is that scanners have small apertures leading to low signal-to-noise ratio (SNR). Yet another disadvantage is that the tonal and spectral responses of scanners are not standardized and thus vary from one scanner to another. Thus, different scanners do not necessarily produce the same appearance values for a spectrally identical measured color.

Still another disadvantage of using a scanner instead of a colorimeter or densitometer is that the responses of each scanner are subject to aging effects due to the gradual variation of both electronic and optical components of the scanner. A further disadvantage is that the input dynamic input range of a typical desktop scanner is generally smaller than the output dynamic range of a printer. Consequently, scanners may not accommodate measuring the entire range of ink densities that printers are able to produce. Yet another disadvantage is that the inherent resolution of the printing device, for example, a color laser printer, that generates color samples to be measured by a scanner may be close or identical to the inherent resolution of the scanner used to read the color samples. Consequently, a resolution conflict occurs that commonly manifests itself as interference patterns in the scanner signals of the image. Additionally, this phenomenon is extremely sensitive to the positioning of the color samples during scanning. A further disadvantage is that the scanner readings are often unreliable when measuring dark colors. The unreliable readings are mainly due to the sensitivity responses of scanners. Such sensitivity responses are commonly linear with respect to the luminance of the measured print color. Therefore, the signal-to-noise ratio of scanner readings of dark colors is lower than the signal-to-noise ratio of scanner readings of light colors, thus causing a higher variability. This effect is an inherent property of CCD devices which are used in the vast majority of scanners for desktop publishing.

Measuring Color Produced by a Printer Using a Scanner

Essentially, using a scanner for printer calibration involves measuring color information in the output of a printer. That is, measuring densities or colorimetric values of color samples generated by a printing device. A scanner thus may be used effectively in many applications in the field of color reproduction. In practice, however, several effects complicate the process of obtaining robust color readings.

SUMMARY OF THE PRESENT INVENTION

The present invention is a method for calibrating color reproduction devices such as printers and for stabilizing the print colors generated by a computer controlled color reproduction device. Further, the present invention acts to standardize the print colors produced across a family or series of color reproduction devices. It may be incorporated into a color management system used to produce consistent colors across a variety of reproduction devices. To accomplish color calibration and stabilization, the present invention uses a scanner to measure patches produced by a color reproduction device. The present invention enables generation of a set of calibration curves for correcting the color output of the color reproduction device. The calibration curves provide modification functions for each of the individual color print channels of the color reproduction device (e.g., CMYK). The calibration curves are used to alter the rendering of color reproductions, and thereby achieve a desired result. The calibration curves may be downloaded to a color management system to alter the rendering of color images, pages, documents, etc., and thereby achieve a desired result. The calibration curves may also be downloaded directly to the controller of the color reproduction device.

To achieve calibration of reproduction devices, the present invention uses a scanner. Additionally, the method of the present invention may be used to measure color densities or colorimetric values on a printed page using a scanner.

In the first embodiment of the present invention, an object scanning device and an object color reproduction device are used to accurately calibrate and stabilize a subject color reproduction device using a subject scanning device. The object devices are used, for example, at a factory; the subject devices are the end user's. The subject scanning device scans a standard target to produce a first plurality of color signals. The standard target comprises a plurality of color patches, where each patch of the plurality of patches represents differing amounts of a single colorant signal. In the first embodiment of the present invention, mixtures of PANTONE® pigments are used for the single-colorant-signal patches. Correction tables are created for the subject scanning device dependent on the first plurality of color signals and a second plurality of color signals that are generated by scanning the standard target using an object scanning device. The second plurality of color signals may be generated once, and stored as a digital file. The subject scanning device is the same type of scanning device as the object scanning device. The subject scanning device scans a subject target to generate a third plurality of color signals. The subject target is produced by printing a "digital" target on the subject color reproduction device. The subject target also comprises a plurality of patches, where each patch of the plurality of patches contains a single ink. A fourth plurality of color signals are generated by applying the scanner correction tables to the third plurality of color signals. In turn, calibration curves for the subject color reproduction device are created using the fourth plurality of color signals and a fifth plurality of color signals. The fifth plurality of color signals are generated by scanning an object target using the object scanning device. The object target is produced by printing the digital target on an object color reproduction device. The fifth plurality of color signals may be generated once, and stored as a digital file. In the first embodiment of the present invention, the subject color reproduction device is the same type of color reproduction device as the object color reproduction device. The object target comprises a plurality of patches, where each patch of the plurality of patches contains a single ink.

In the second embodiment of the present invention, an object color measuring device and an object color reproduction device are used to accurately calibrate and stabilize a subject color reproduction device using a subject scanning device. In the second embodiment, an object densitometer is used as the measuring device to measure densities. In an alternate embodiment, an object colorimeter is used as the measuring device to measure CIE values.

In the second embodiment, the object densitometer is used to measure the CMYK densities of the reference target (the standard target). Preferably, the reference target is comprised of single-colorant-signal patches printed using the same inks as used by the subject color reproduction device. The subject scanning device scans the reference target to produce a first plurality of color signals. Translation tables are created for the subject scanning device dependent on the first plurality of color signals generated by scanning the reference target and on a second plurality of color signals, in this embodiment a second plurality of density values generated by measuring the reference target using the object densitometer. The second plurality of density values may be generated once and stored as a digital file. The subject scanning device scans a subject target to generate a third plurality of color signals. The subject target is produced by printing a digital target on the subject color reproduction device. The subject target also comprises a plurality of patches, where each patch of the plurality of patches contains a single ink. A fourth plurality of color signals, in this embodiment a fourth plurality of density values, is generated by applying the translation tables to the third plurality of color signals. In turn, calibration curves for the subject color reproduction device are created using the fourth plurality of density values and a fifth plurality of color signals, in this embodiment a fifth plurality of density values. The fifth plurality of density values serve as a "target scale" for the behavior of the subject color reproduction device. Preferably, the fifth plurality of density values are generated by measuring a printed page with a desired appearance of the same type as the subject target using a printer of the same type as the subject color reproduction device.

In the alternate embodiment, an object colorimeter is used for measuring the CIE values of the reference target. As in the second embodiment, the reference target is preferably comprised of single-colorant-signal patches printed using the same inks as used by the subject color reproduction device. The subject scanning device scans the reference target to produce a first plurality of color signals. Translation tables are created for the subject scanning device dependent on the first plurality of color signals generated by scanning the reference target and on a second plurality of color signals, in this embodiment a second plurality of CIE values generated by measuring the reference target using the object colorimeter. The second plurality of CIE values may be generated once and stored as a digital file. The subject scanning device scans a subject target to generate a third plurality of color signals. The subject target is produced by printing a digital target on the subject color reproduction device. The subject target also comprises a plurality of patches, where each patch of the plurality of patches contains a single ink. A fourth plurality of color signals, in this embodiment a fourth plurality of CIE values, is generated by applying the translation tables to the third plurality of color signals. In turn, calibration curves for the subject color reproduction device are created using the fourth plurality of CIE values and a fifth plurality of color signals, in this embodiment a fifth plurality of CIE values. The fifth plurality of CIE values serve as the "target scale" for the behavior of the subject color reproduction device. Preferably, the fifth plurality of CIE values are generated by measuring a printed page with a desired appearance of the same type as the subject target using a printer of the same type as the subject color reproduction device.

The present invention further provides an improved method of measuring ink densities using a subject scanner. In the present invention, a target comprising a plurality of single-ink patches is placed at a defocused point with respect to a focal point of the scanning device. Each patch consists of a half-tone pattern that appears as samples, which are sparsely distributed on the paper. Thus, when defocused, an individual patch appears uniform and lighter than the individual samples. The scanning device for measuring ink density scans the target to produce a plurality of scan signals. In the embodiment of the present invention, each target comprises four scales of nine ink values per ink. Each ink value is printed on a separate patch, and the patches are placed in random order on the target. Reference signals are generated by averaging corresponding scan signals for each plurality of ink patches having the same ink value. The randomization of patch locations and the repetition of patches on the target reduce the effects of noise, spatial correlation, and non-uniformity of both the reproduction device and the scanning device. Further, defocusing the target overcomes prior art disadvantages of measuring high density ink patches using a scanning device and the sensitivity to the interference patterns caused by interference between the scanner and the print.

In an alternate embodiment of the present invention, a diffusing substrate rather than defocusing means is placed in between a target comprising a plurality of single-ink patches and the scanning device. The scanning device for measuring ink density scans the target to produce a plurality of scan signals. As with the method of defocusing described above, diffusing the target overcomes prior art disadvantages of spatial correlation, thereby reducing significantly the undesired interference patterns.

BRIEF DESCRIPTION OF THE DRAWINGS

FIG. 4 is a diagram illustrating an object scanner/printer system and a subject scanner/printer system according to the first embodiment of the present invention;

FIGS. 5A and 5B are perspective-view and side-view diagrams of a target disposed on the scanner, respectively, according to the prior art;

FIGS. 6A and 6B are side-view and bottom, perspective-view diagrams of a target disposed on the scanner according to the defocusing embodiment of the present invention;

FIGS. 13 is a side-view diagram of a target disposed on the scanner according to the diffusing, alternative embodiment of the present invention; and FIG. 14 is diagram of the target holder according to the defocusing embodiment of the present invention.

DETAILED DESCRIPTION OF THE PRESENT INVENTION

Figure 1:
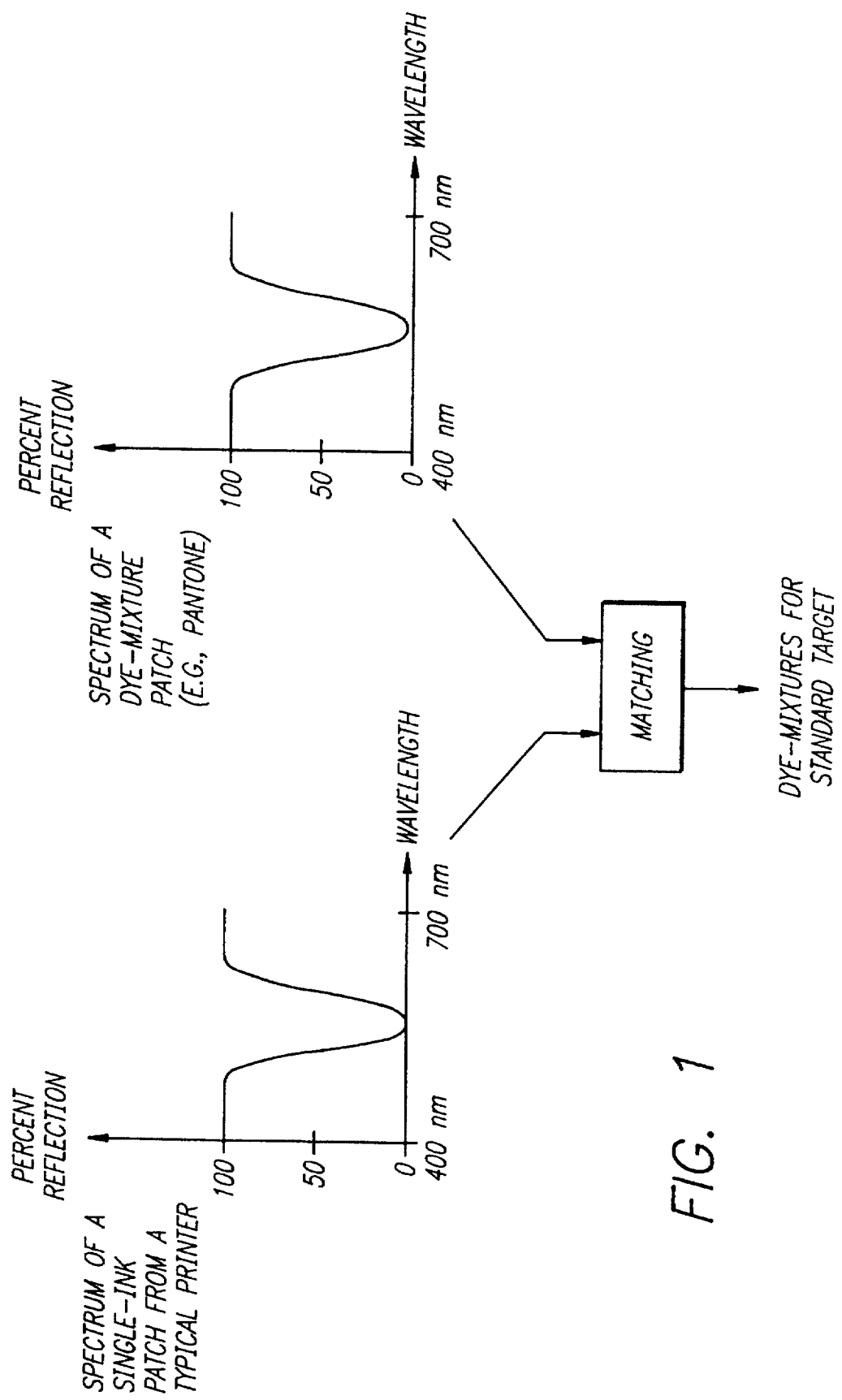
FIG. 1 is a drawing illustrating a process of spectra matching to produce a standard target.

A method for calibrating a color printer using a scanner is described. In the following description, numerous specific details, such as number and nature of target patches, ink densities, etc., are described in detail to provide a more thorough description of the present invention. It will be apparent, however, to one skilled in the art that the present invention may be practiced without these specific details. In other instances, well-known features have not been described in detail so as not to unnecessarily obscure the present invention.

Overview of the Present Invention

The present invention is a method for calibrating color reproduction devices such as printers and for stabilizing the print colors generated by a computer controlled color reproduction device. Further, the present invention acts to standardize the print colors produced across a family or series of color reproduction devices. It may be incorporated into a color management system such as the assignee's EfiColor® color management system used to produce consistent colors across a variety of reproduction devices. To accomplish color calibration and stabilization, the present invention uses the scanning capabilities of a scanner to measure patches produced by a color reproduction device. The present invention enables generation of a set of calibration curves for correcting the color output of the color reproduction device. The calibration curves provide modification functions for each of the individual color print channels of the color reproduction device (e.g., CMYK). The calibration curves are used to alter the rendering of color reproductions. The calibration curves may be downloaded to a color management system to alter the rendering of color reproductions, documents, etc., and thereby achieve a correct result.

To achieve calibration of reproduction devices, the present invention uses a scanner. In an alternate embodiment, the present invention may also be used to measure color densities and colorimetric values of individual colorants on a printed page using a scanner.

The First Embodiment

The first embodiment of the present invention is described in detail below with reference to FIG. 4. FIG. 4 is a system diagram illustrating an object color scanner/printer system 408 and a subject color scanner/printer system 418. The object color scanner/printer typically is one system available as a "reference" for example at the manufacturer's, and the subject color scanner/printer is the system to be calibrated, typically at a user site. The object scanner/printer system 408 includes object scanner 402, object controller 404, and object printer 406. The subject scanner/printer system 418 includes subject scanner 412, subject controller 414, and subject printer 416. The object scanner 402 is coupled to object controller 404 by connection 422. Object controller 404 is coupled to object printer 406 by connection 424. Similarly, the subject scanner 412 is coupled to subject controller 414 by connection 432. Subject controller 414 is coupled to subject printer 416 by connection 434.

As stated above, the object color scanner/printer system 408 is a reference system in the present invention having well measured color characteristics for both the object scanner 402 and the object printer 406. The object scanner 402 and object printer 406 are calibrated to provide a reference system for calibrating a subject color scanner/printer system 418. The subject scanner 412 and subject printer 416 of the subject color scanner/printer system 418 are calibrated with respect to the object color scanner/printer system 408 for stabilizing the print colors generated by the subject printer 416 and standardizing the print colors produced across a family or series of subject color printing devices. While the present invention is described with respect to a system with separate scanner 402 (412) and printer 406 (416) devices, it should be apparent to a person skilled in the art that the color scanner/printer system 408 may comprise a color copying system (e.g., a color laser copier device) including both a color scanner and printer in a single device. It should also be apparent to a person skilled in the art that the word printer is used herein in a general sense, and includes any color reproduction device, including an imagesetter/press combination.

Figure 7:
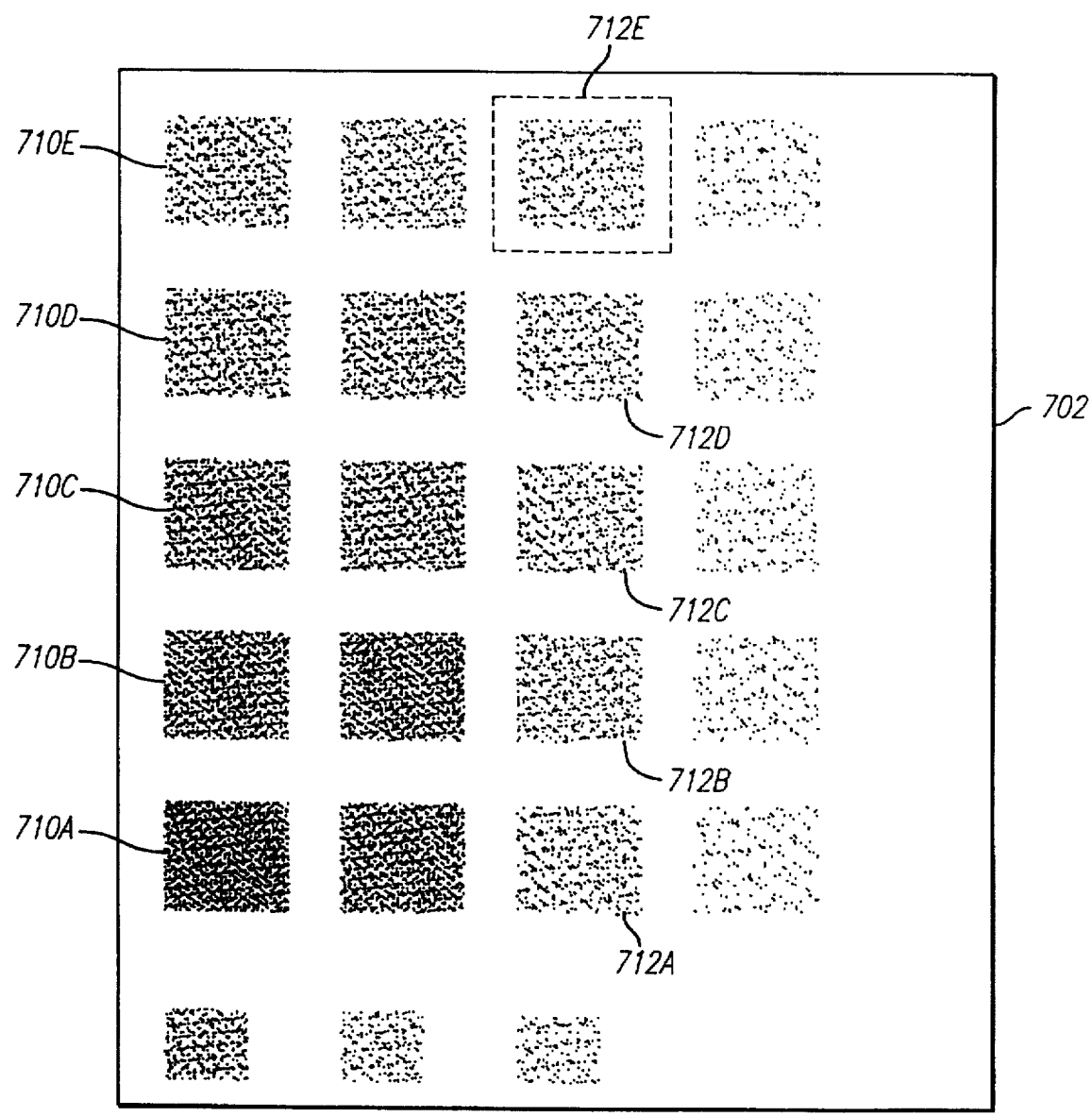
FIG. 7 is a diagram illustrating a target comprising a plurality of patches.

FIG. 7 is a diagram illustrating a target 702 comprising a plurality of color patches. In target 702, each vertical column of patches comprises a single ink (color) having different ink densities. In a group of patches 710A–710E, the patches have a first ink color. Patch 710A has the highest density of ink for patches 710A–710E, whereas patch 710E has the lowest density of ink. In another group of patches 712A–712E, the patches have another ink color. Similarly, patch 712A has the highest ink density for patches 712A–712E, whereas patch 712E has the lowest ink density. As described below, the present invention may randomly place the patches on target 702 to overcome disadvantages of the prior art.

Standard Targets

The first embodiment of the present invention uses a standard target for calibrating the subject scanner 412 with respect to a calibrated reference scanner, the object scanner 402. The standard target 310 (see FIG. 3(a)) is a physical target used as a "ground truth" to assist in minimizing the variability among different types of scanners used in the present invention, where the object and subject scanners 402 and 412 are the same type of scanner. Further, the standard target 310 is used to account for drift in scanner responses due to inevitable aging of scanners and for the occasional alteration of the scanner behavior due to machine servicing.

The present invention generates scanner correction tables for the R, G, and B readings of the subject scanner to convert these readings as if they were made on the reference object scanner. The output of the object scanner when scanning the reference target is compared to the output of the subject scanner when scanning the reference target. The output of the subject scanner is obtained by the user scanning the target whenever calibration is desired, and the output of the object scanner is supplied as digital data to the user.

In the first embodiment, the reference target is chosen so that it may be mass produced and so that it is a "standard" in that each individual target does not need to be measured. For this purpose, standard targets require: consistency across the page and consistency between batches; durability with little fading or darkening of dark and light areas, respectively; the smallest amount of metamerism when using a specific scanner and/or light source with respect to the inks of the subject/object printer (that is, similarity in the spectral characteristics to those of the printer colorants); and similar paper to that used in the subject/object printer. For small amounts of metamerism and similar paper, it is preferable to make the standard target from the same inks and paper. However, since mass production and the expense of inks and paper are important, reference inks such as PANTONE® inks are used to manufacture the targets. The PANTONE® inks also provide durability and consistency across the page and between batches.

The standard target 310 consists of various combinations of PANTONE® pigments that simulate varying amounts of the cyan, magenta, yellow, and black colorants used in the printer. Reference ink systems other than PANTONE® may be used. The PANTONE® patches simulate a range of colorants from pure (basic) CMYK colorants to lighter amounts of the same. In the first embodiment of the invention, the reference inks, in this case PANTONE® colors, are selected to optimize the similarity of their spectral reflectance characteristics to those of the corresponding C, M, Y, and K inks of the object and subject printers 406 and 416. PANTONE® colors are used in the standard target 310 that closely resemble the inks of the object and subject printers 406 and 416 to reduce deviations between readings of the subject scanner 412 and the object scanner 402 when scanning the PANTONE® colors and the inks of the subject printer 416. The extent that the deviation is reduced is dependent upon the match between the inks of the printers and the PANTONE® color mixtures. A set of colorants consists of C, M, and Y (i.e., CMY). The set of colorants may further comprise K (i.e., CMYK). Scanner metamerism affects the similarity between inks of the printers and the PANTONE® colors; thus, the spectral reflectance functions of the PANTONE® colors do not necessarily have to match those of the subject printer inks to accurately account for the deviation between readings of the subject scanner 412 and the object scanner 402.

The procedure for calculating the mixture is illustrated in FIG. 1. Standard methods for calculating PANTONE® mixtures that simulate the printer inks are well-known in the art. For a detailed description of calculating PANTONE® mixtures, see Billmeyer, Jr., Fred W., and Max Saltzman, *Principles of Color Technology*, Second Edition, Chapter 5: "The Coloring of Materials in Industry", New York: John Wiley & Sons, 1981, incorporated herein by reference.

Figure 3A:
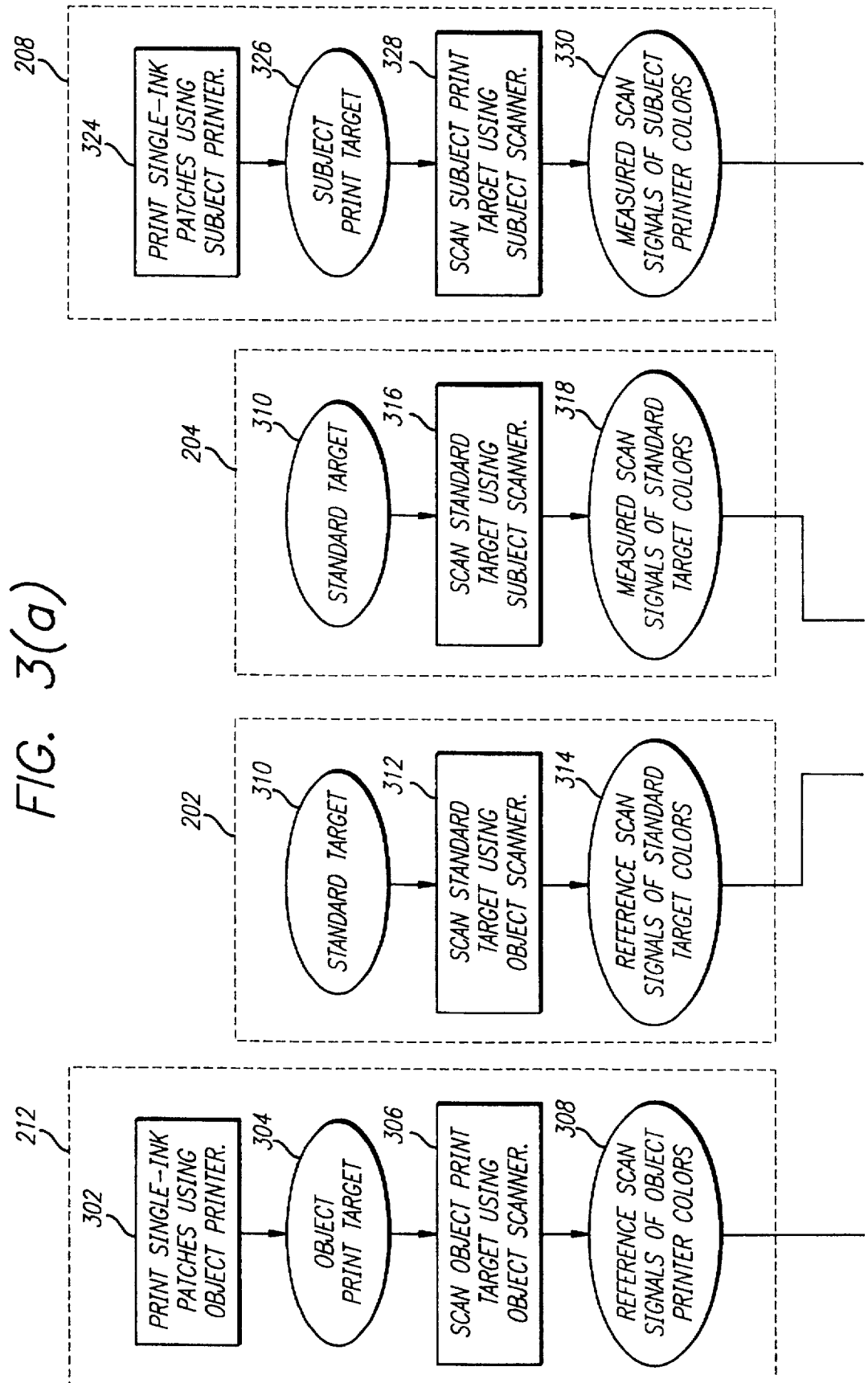
FIGS. 3(a) and 3(b) are detailed flow diagrams for calibrating the subject printer according to the first embodiment of the present invention.
Figure 3B:
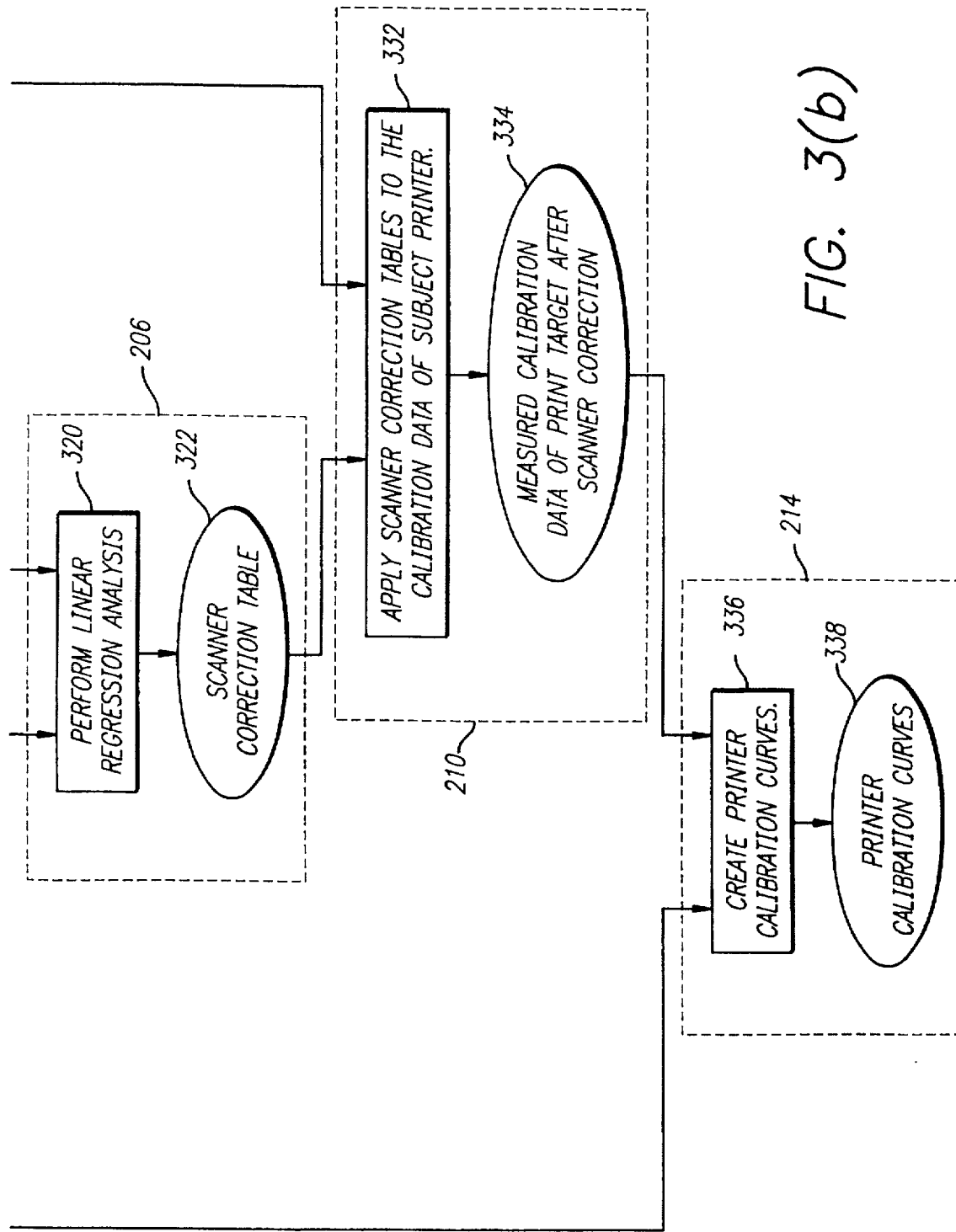

As stated above, in the first embodiment of the present invention illustrated in FIGS. 3(a) and 3(b), scanner correction tables 322 are generated using a set of standardized object scanner readings 314 of the standard target 310 that is supplied as a digital file. The scanner correction tables 322 comprising "scanner compensation" tables for each of R, G, and B, enable the transformation of RGB readings of the subject scanner 412 as if generated on the object scanner 402. For printer calibration, the scanner correction tables 322 are subsequently applied to scanner readings 330 of patches of the subject print target 326 produced by the subject printer 416.

In the first embodiment of the present invention, the calibrated object scanner 402 generates reference scan signals 314 by scanning the PANTONE® colors of the standard target 310. The object scanner 402 is typically the same type of scanner as the subject scanner 412. To reduce noise effects, reference scan signals may be generated several times to produce a plurality of reference scan signals from the object scanner 402. The plurality of reference scan signals from the object scanner 402 are averaged to produce reference scan signals 314.

When the subject scanner 412 scans the standard target 310, the subject scanner outputs for each of the R, G, and B channels are compared to the object scanner readings 314 in R, G, and B, respectively, of the standard target 310 that is supplied as a digital file. A curve-fitting procedure, linear-regression in the preferred embodiment, is performed for each of R, G, and B channels to generate the scanner correction tables 322.

Object and Subject Print Targets

Calibrating the subject printer requires generating calibration curves. To generate printer calibration curves requires the measurement of the current state of the subject printer and comparing measurements to data representing the "desired" state of the subject printer.

In prior art methods, the current state of the subject printer may be determined by using a densitometer to measure the densities printed in response to a set of colorant signals supplied to the printer. The densitometer measurements are compared to the desired densities that would be produced by a calibrated printer, and thus printer calibration curves may be generated.

In the present invention, the subject scanner 412 is used to determine the state of the subject printer 416. Thus the desired state of the subject printer is specified as the desired RGB output produced by an object scanner when scanning a page printed by an object printer. The method involves producing a subject target on the subject printer by printing a "digital" target. The subject target is scanned on the subject scanner, and the output of the subject scanner is corrected using the present invention to equivalent object scanner output. The output of the subject scanner is compared to the output of the standard object scanner obtained by scanning a target, which is produced by printing the digital target using the standard object printer. The comparison information is used to produce printer calibration curves.

In the first embodiment of the present invention, the subject printer 416 generates a subject print target 326, illustrated in FIGS. 3(a) and 3(b), using nominal color ink values (i.e., nominal values for each of the C, M, Y, and K channels). A digital target provides the nominal color ink values for obtaining the measurement scales of the subject printer 416. The subject controller 414 outputs the digital target, an electronic file, to the subject printer 416. In the first embodiment of the present invention, the subject print target 326 consists of 144 patches of single inks located on the page in a random like but known order. The scale for each ink consists of nine steps from darkest to lightest (i.e., paper-white) color in equal intervals, with four such scales for each of the four inks. In the present invention, the ink values for the subject printer 416 are each represented by 8-bits. The nine step values of each ink have the following values: 0, 32, 64, 96, 128, 160, 192, 224, and 255. Thus, for a subject printer 416 using four inks, each target comprises four scales of nine ink values per ink. This is repeated to give four such sets of four scales. Each ink value is printed on a separate patch, and the patches are randomly ordered on the target. The present invention is not limited to 8-bit ink values, nine-step scales for each ink, or targets comprising 144 patches of single inks; other number of bits for ink values, number of steps per ink scale, and number of single-ink patches per target may be used without departing from the scope of the present invention. In addition, patches may be located in any arbitrary order, not necessarily a random order, without departing from the scope of the present invention.

As stated above, each color of the ink scale is repeated four times (four patches) in the subject print target 326. The randomization of patch locations and the repetition of patches on the target are useful for reducing the effects of noise, spatial correlation, and non-uniformity of the subject printer 416 (writing the target 326) and the subject scanner 412 (reading the target).

A set of standardized scanner readings 308 dependent upon the digital target is provided to the calibration procedure of the present invention as "target" scales for the subject printer 416. The standardized scanner readings (reference scan signals) 308 serve analogously to the target density scales used in prior art calibrators that use densitometers to measure the output of a subject printer. The reference scan signals 308 are obtained using the object print target 304 from the calibrated object printer 406. The object printer 406 generates the object print target 304 using the nominal color ink values of the digital target. The digital target is used to obtain the measurement scales of the calibrated object printer 406. The object print target 304 consists of 144 randomly ordered patches of single inks having nine step values of 0 to 255 in intervals of 32 (and one 31-long interval), as described above for the subject print target 326. The calibrated object scanner 306 is used to scan the object print target 304 to produce the reference scan signals 308. This process for generating the reference scan signals 308 may be repeated several times, and the resulting scan signals are averaged to reduce noise effects. The object printer is calibrated when printing the object print target; the calibration may be performed using conventional means at a factory, for example, where the object printer typically is located.

Three-channel scanner signals 308 (R, G, and B) are available to generate the four printer calibration curves, one for each of the C, M, Y, and K channels of the printer. Various combinations of the R, G, and B scanner signals may be used to generate each of the four printer calibration curves. In the first embodiment of the present invention, the allocation of scan signals to printed inks is: the red scanner signal is allocated to determine the cyan ink calibration, the green scanner signal is allocated to determine the magenta ink calibration, the blue scanner signal is allocated to determine the yellow ink calibration, and the green scanner signal is allocated to determine the black ink calibration. The foregoing allocation results from observations of the largest correlation between the spectral reflectances of individual inks to the spectral sensitivities of the scanner channels. In particular, the observation that the cyan subtractive primary is white minus red, the magenta subtractive primary is white minus green, and the yellow subtractive primary is white minus blue. Alternate embodiments may be practiced without departing from the scope of the present invention. For example, the average of red, green, and blue may be assigned to the black ink channel.

The calibration curves for each of the printer channels C, M, Y, and K are produced by combining the readings obtained for each channel using the subject scanner with the desired readings from the calibrated object scanner using the above allocation.

Flow Diagrams of the First Embodiment of the Present Invention

Figure 2:
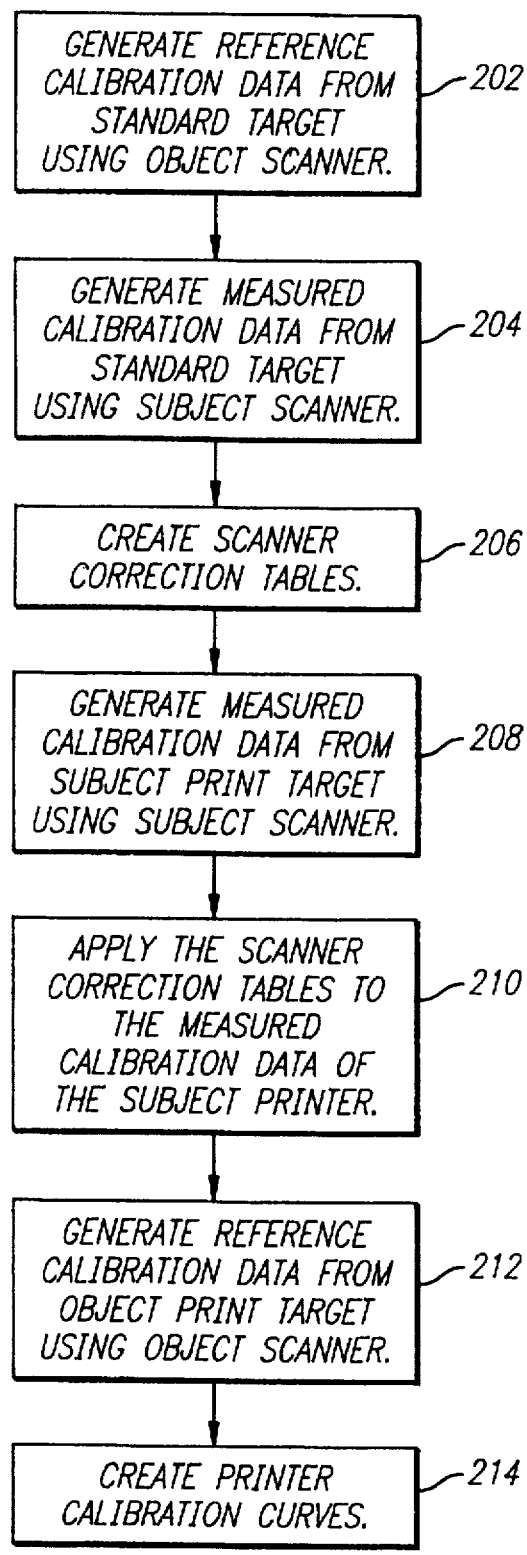
FIG. 2 is a flow diagram for calibrating a subject printer according to the first embodiment of the present invention.

FIG. 2 is a flow diagram illustrating the method of the first embodiment of the present invention for the case of a C, M, Y, and K printer. In step 202, the object scanner 402 generates reference calibration data comprising reference scan signals 314 of the standard target 310. Step 202 must be performed once to produce the reference scan signals 314. Stored values of the reference scan signals 314 may be subsequently used to create scanner correction tables 322. Thus, once the reference scan signals 314 are created, they may be used multiple times and with a plurality of subject scanner/printer systems of the same type. In step 204, the subject scanner 412 generates measured calibration data comprising measured scan signals 318 of the standard target 310. In step 206, scanner correction tables 322 are generated using the reference calibration data (reference scan signals 314) and measured calibration data (measured scan signals 318) from the object and subject scanners 402 and 412, respectively. In step 208, the subject scanner 412 generates measured calibration data comprising measured scan signals 330 of the subject printer colors. In step 210, the scanner correction tables 322 are applied to the measured calibration data (measured scan signals 330 of subject printer colors) of the subject printer 416. In step 212, the object scanner 402 generates reference calibration data comprising reference scan signals 308 of the object printer colors. Step 212 must be performed once to produce the reference scan signals 308. Stored values of the reference scan signals 308 may be subsequently used. Thus, once the reference scan signals 308 are created, they may be used multiple times and with a plurality of subject scanner/printer systems of the same type. In step 214, printer calibration curves 338 are created using the reference scan signals 308 of the object print target 304 and the measured calibration data 330 of the subject print target 326 after scanner correction.

FIGS. 3(*a*) and 3(*b*) are flow diagrams illustrating the method of the first embodiment of the present invention. Referring to step 202 of FIG. 2, a standard target 310 is provided to step 312. In step 312, the object scanner 402 scans the standard target 310 to produce reference scan signals 314 of the standard target colors. As described above with reference to FIG. 2, the reference scan signals 314 of the standard target colors are only required to be generated once. Referring to step 204, a standard target is provided to step 316. In step 316, the subject scanner 412 scans the standard target 310 to produce measured scan signals 318 of the standard target colors. Referring to step 206, the reference scan signals 314 of the standard target and measured scan signals 318 of the standard target are provided to step 320. In step 320, the subject controller 414 performs linear regression analysis on reference scan signals 314 and measured scan signals 318 to produce scanner correction tables 322.

Referring to step 208, the subject printer 416 prints single-ink patches using a digital target as input in step 324 to produce a subject print target 326. The subject print target 326 is provided to step 328. In step 328, the subject scanner 412 scans the subject print target 326 to produce measured scan signals 330 of the subject printer colors. Referring to step 210, the scanner correction tables 322 and the measured scan signals 330 of the subject printer colors are provided to step 332. In step 332, the subject controller 414 applies the scanner correction tables 322 to the calibration data of the subject printer 416 (i.e., the measured scan signals 330 of the subject printer colors) to produce measured calibration data 334 of the print target after scanner correction.

Referring to step 212, the object printer 406 prints single-ink patches using the digital target in step 302 to produce an object print target 304. The object print target 304 is provided to step 306. In step 306, the object scanner 402 scans the object print target 304 to produce reference scan signals 308 of the object printer colors. As described previously, the reference scan signals 308 of the object printer colors need to be generated once. Referring to step 214, the reference scan signals 308 of the object printer colors and the measured calibration data 334 of the print target after scanner correction are provided to step 336. In step 336, the subject controller 414 creates printer calibration curves 338 using the reference scan signals 308 of the object printer colors and the measured calibration data 334 of the print target after scanner correction. The printer calibration curves 338 may be used to alter the rendering of color reproductions and other documents, thereby achieving a desired result.

The Second Embodiment

Figure 12:
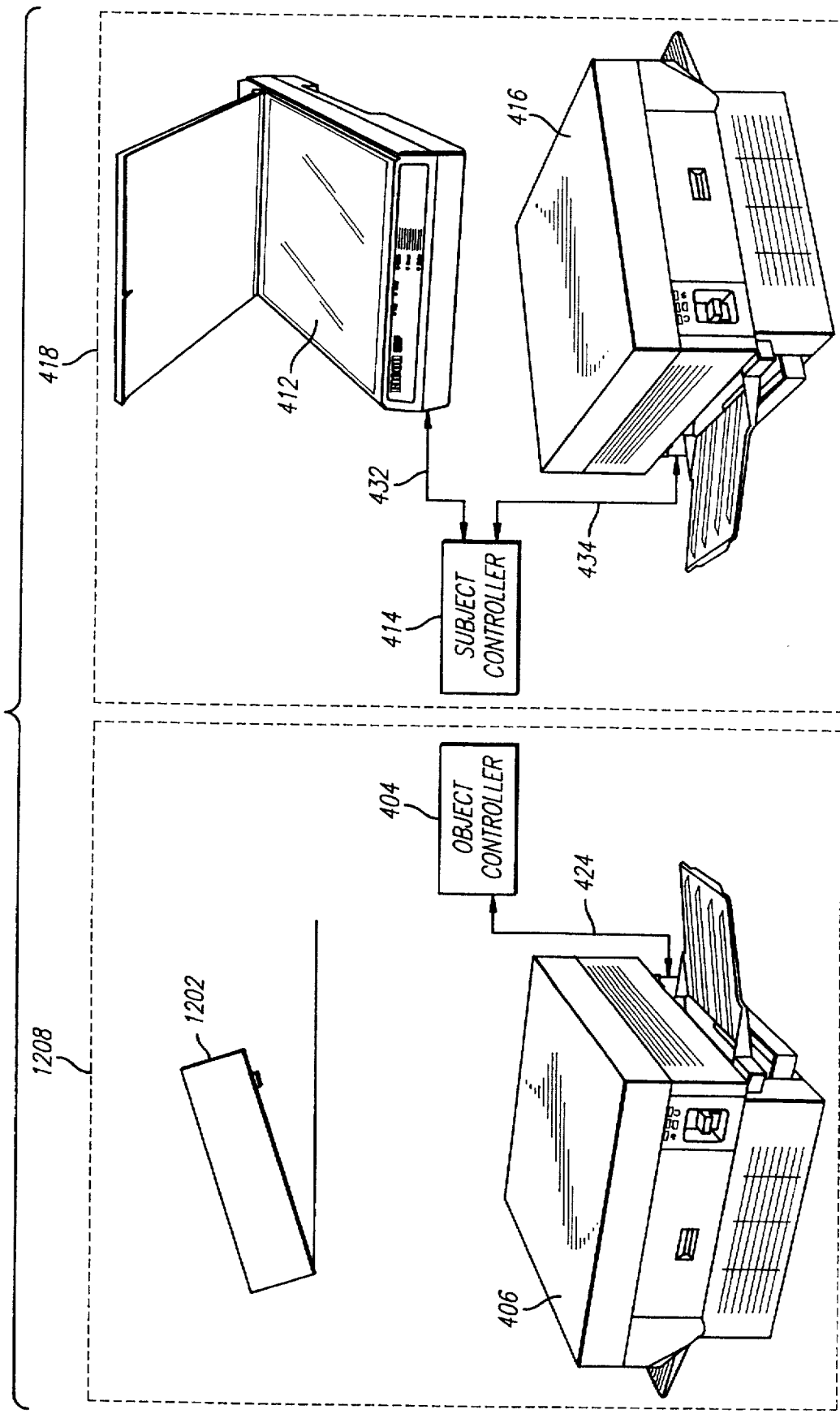
FIG. 12 is a diagram illustrating an object measuring device/printer system and a subject scanner/printer system according to second embodiment of the present invention.

The second embodiment of the present invention is described in detail below with reference to FIG. 12. FIG. 12 is a system diagram illustrating an object color densitometer/printer system 1208 and a subject color scanner/printer system 418. The object system is available as a "reference" system at a first location, for example, and the subject system is to be calibrated, typically by a user at another location. The object system 1208 includes object measurement device 1202 (shown as a densitometer), object controller 404, and object printer 406. The subject scanner/printer system 418 includes subject scanner 412, subject controller 414, and subject printer 416. The object controller 404 is coupled to object printer 406 by connection 424. The subject scanner 412 is coupled to subject controller 414 by connection 432. Subject controller 414 is coupled to subject printer 416 by connection 434.

In an alternate embodiment, an object colorimeter may be used as the object measurement device 1202. In the following detailed description, a densitometer is used for the object measurement device 1202 and density measurements are made; however, the method may be implemented equivalently in an alternate embodiment using a colorimeter, in which case density values are CIE values without loss of generality. Thus, although the second embodiment is described in terms of an object densitometer, it should be apparent to a person skilled in the art that the present invention applies to any object color measurement device 1202 such as an object colorimeter. Further, it should be apparent to a person skilled in the art how CIE values may be used in the present invention instead of density values.

The object color system 1208 is a reference system in the present invention having well measured color characteristics for the object printer 406. The object printer 406 is calibrated to provide a reference system for calibrating a subject color scanner/printer system 418. The subject scanner 412 and subject printer 416 of the subject color scanner/printer system 418 are calibrated with respect to the object color densitometer (or other color measuring device) for stabilizing the print colors generated by the subject printer 416 and standardizing the print colors produced across a family or series of subject color printing devices. As described previously, while the present invention is described with respect to a system having a separate scanner (412) and printer (416) device, it should be apparent to a person skilled in the art that the color scanner/printer system 418 may comprise a color copying system (e.g., a color laser copier device) including both a color scanner and printer in a single device. It should also be apparent to a person skilled in the art that the term printer, as used herein, refers to a color reproduction device, including an imagesetter/press combination.

The present invention generates scanner correction tables for the R, G, and B readings of the subject scanner to convert the R, G, and B readings as though they were obtained using an object densitometer (or, in an alternate embodiment, readings in CIE values made using the object colorimeter). A reference target is used. Unlike the first embodiment that uses PANTONE® inks for a standard target, the reference target may be printed less expensively on the object printer. However, each individual target needs to be measured. The density values of the reference target are compared to the output readings of the subject scanner when scanning the reference target. The output of the subject scanner is obtained by scanning the target whenever calibration is desired; the density values of the reference target are supplied as digital data (i.e., a digital file). In an alternate embodiment, the density values of the reference target are encoded on the target itself as bar codes or in the form of characters. When the reference target is scanned on the subject scanner, the density readings that are encoded on the target are decoded by a bar code decoder when densities are supplied as bar codes, or by an optical character recognition (OCR) method when densities are supplied in the form of characters. Other encoding methods are also possible and may be readily implemented without departing from the scope of the present invention.

In the second embodiment, the reference target is chosen so that it is inexpensive and, to eliminate metamers, uses the same colorants as used in the subject printer. The first embodiment uses more expensive, standard pigments such as PANTONE® to ensure consistency and mass-reproducibility. In addition, procedures are required in the first embodiment to simulate the subject printer colorants using the PANTONE® pigments. In the second embodiment, each individual target is printed on a calibrated object printer using similar colorants as those of the subject printer, and the densities measured on each such individual target are provided.

Figure 11A:
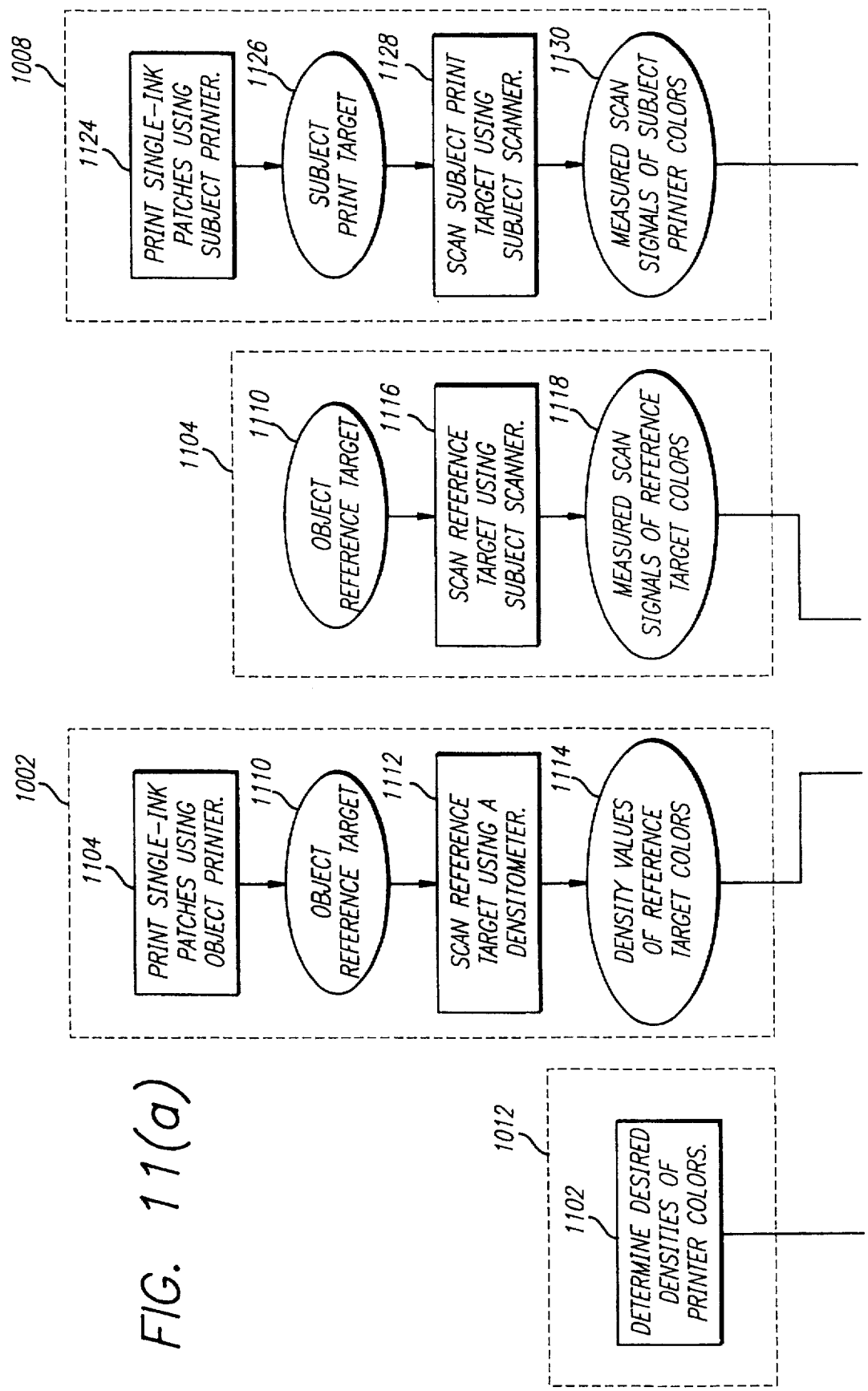
FIGS. 11(a) and 11(b) are flow diagrams for calibrating the subject printer according to second embodiment of the present invention.

Referring to FIG. 11(a), the standard target (object reference target) 1110 consists of varying amounts of the cyan, magenta, yellow, and black colorants printed on the object printer 406. In the second embodiment, the standard consists of printing patches comprising C, M, Y, and K, each of varying values of 0, 45, 90, 135, 180, and 225. Thus, the object reference target consists of 24 patches.

The set of standard density values 1114 of the standard target 1110 for each individual target is supplied as a digital file or is encoded with each individual target, and is used to generate scanner correction tables (also called scanner translation tables) 1122. The scanner correction tables 1122 comprise "scanner translation" tables for each R, G, and B channel for translating the RGB triplets to standard C, M, Y, and K densities to transform RGB readings of the subject scanner 412 as though measured using the object color measuring device 1202 (in this embodiment the object densitometer). When an object colorimeter is used for the object color measuring device 1202, it should be apparent to a person skilled in the art that the scanner correction tables 1122, comprising scanner translation tables for each R, G, and B channel, translates RGB triplets to standard CIE values for transforming RGB readings of the subject scanner 412 as though measured using the object colorimeter. In either embodiment, for printer calibration, the scanner correction tables 1122 are subsequently applied to scanner readings 1130 for patches of the subject print target 1126 produced by the subject printer 416.

In the second embodiment of the present invention, the object measurement device 1202 (the object densitometer) generates the densities of each object reference target 1110 to produce reference density values 1114.

When the standard object reference target 1110 is scanned by the subject scanner 412, the outputs of the subject scanner for each of the R, G, B and G channels are compared to the standard density values 1114 in C, M, Y, and K, respectively; the density values 1114 of the standard target 1110 are either provided as a digital file or encoded on the standard target 1110. When the density values 1114 are encoded on the target 1110, a decoding step precedes the comparison. The values are made continuous (that is, interpolated) by a piecewise linear curve-fitting interpolation between readings combined with extrapolation to stretch values to the full scale, 255 in the second embodiment. This generates four scanner translation tables 1122: R subject scanner readings correspond to C density, G subject scanner readings correspond to M density, B subject scanner readings correspond to Y density, and G subject scanner readings correspond to K density. Alternate multidimensional mappings may be used, for example to map combined subject scanner readings R, G, and B to each of C density, M density, Y density, and K density. Alternatively, to increase accuracy, interpolation and extrapolation other than piecewise linear may be used. In one such alternate embodiment, polynomial interpolation and extrapolation is used. In another alternate embodiment, logarithmic functions are used.

Calibrating the subject printer requires generating calibration curves. To generate printer calibration curves requires the measuring the current state of the subject printer 416 and comparing these to data representing the "desired" state of the subject printer 416. The subject scanner 412 is used to determine the state of the subject printer 416. Thus the desired state of the subject printer 416 is specified as the desired densities as though measured by an object color measurement device (densitometer) when measuring a page printed by an object printer 406. The method involves producing a subject target on the subject printer 416 by printing a digital target. The subject target is scanned on the subject scanner 412, and the output of the subject scanner 412 is corrected using the translation tables 1122 of the present invention to equivalent standard densities. This is compared to the actual densities of the object color measurement device 1202 (the object densitometer) measuring a page produced by printing the digital target on the object printer 406. The comparison is used to produce printer calibration curves.

Figure 11B:
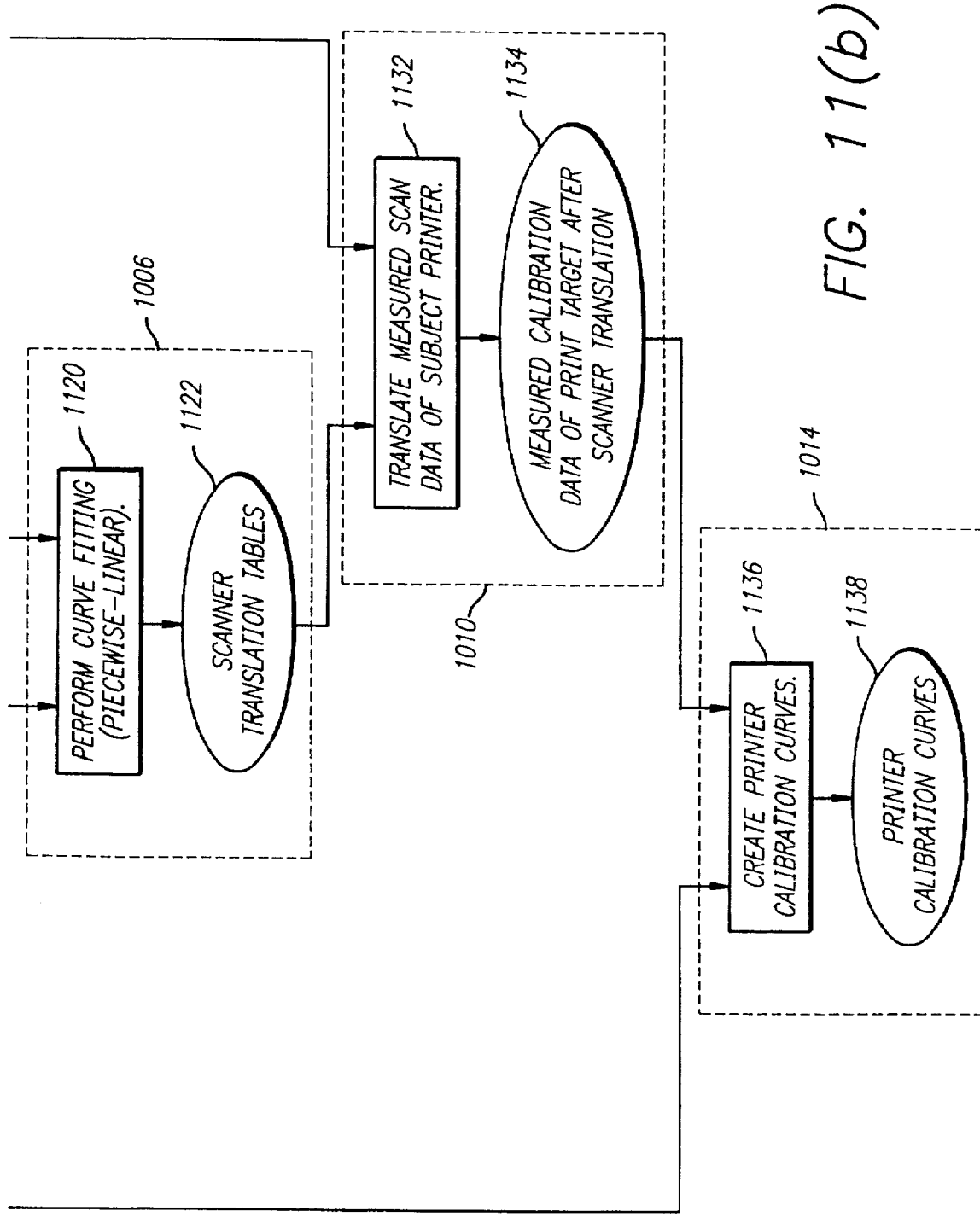

In the second embodiment of the present invention, the subject printer 416 generates a subject print target 1126 (shown in FIG. 11(*a*)) using nominal color ink values—that is nominal values for each of the C, M, Y, and K channels. A digital target provides the nominal color ink values for obtaining the measurement scales of the subject printer 416. The subject controller 414 outputs the digital target, an electronic file, to the subject printer 416. In the second embodiment of the present invention, the subject print target 1126 consists of 144 patches of single inks ordered on the page in a random-like but known pattern. The scale for each ink consists of nine steps from darkest to lightest (i.e., paper-white) color in equal intervals. In the present invention, the ink values for the subject printer 416 are each represented by 8-bits. The nine step values of each ink have the following values: 0, 32, 64, 96, 128, 160, 192, 224, and 255. Thus, for a subject printer 416 using four inks, each target comprises four scales of nine ink values per ink. Each ink value is printed on a separate patch, and the patches are randomly ordered on the target. The present invention is not limited to 8-bit ink values, nine-step scales for each ink, or targets comprising 144 patches of single inks; other number of bits for ink values, number of steps per ink scale, and number of single-ink patches per target may be used without departing from the scope of the present invention. In addition, patches may be located in any arbitrary order, not necessarily a random order, without departing from the scope of the present invention.

As stated above, each color of the ink scale is repeated four times (four patches) in the subject print target 1126. The randomization of patch locations and the repetition of patches on the target are useful for reducing the effects of noise, spatial correlation, and non-uniformity of the subject printer 416 (writing the target 1126) and the subject scanner 412 (reading the target).

A set of standardized densities 1102 that should be produced for the digital target is provided to the calibration procedure of the present invention as "target" scales for the subject printer 416. If an object colorimeter is used as the object color measurement device, then a set of standardizes CIE values rather than standardized densities would be provided. The standardized densities (or CIE values) 1102 serve analogously to the target density scales used in prior art calibrators that use densitometers to measure the output of a subject printer.

The generation of the four printer calibration curves 1138 (one for each of the C, M Y and K channels of the printer) proceeds as in prior art calibrators that use densitometers. The calibration curves for each of the printer channels C, M, Y, and K are produced by combining the readings obtained for each channel using the subject scanner after conversion to density values 1134 with the desired densities 1102.

Flow Diagrams of the Second Embodiment

Figure 10:
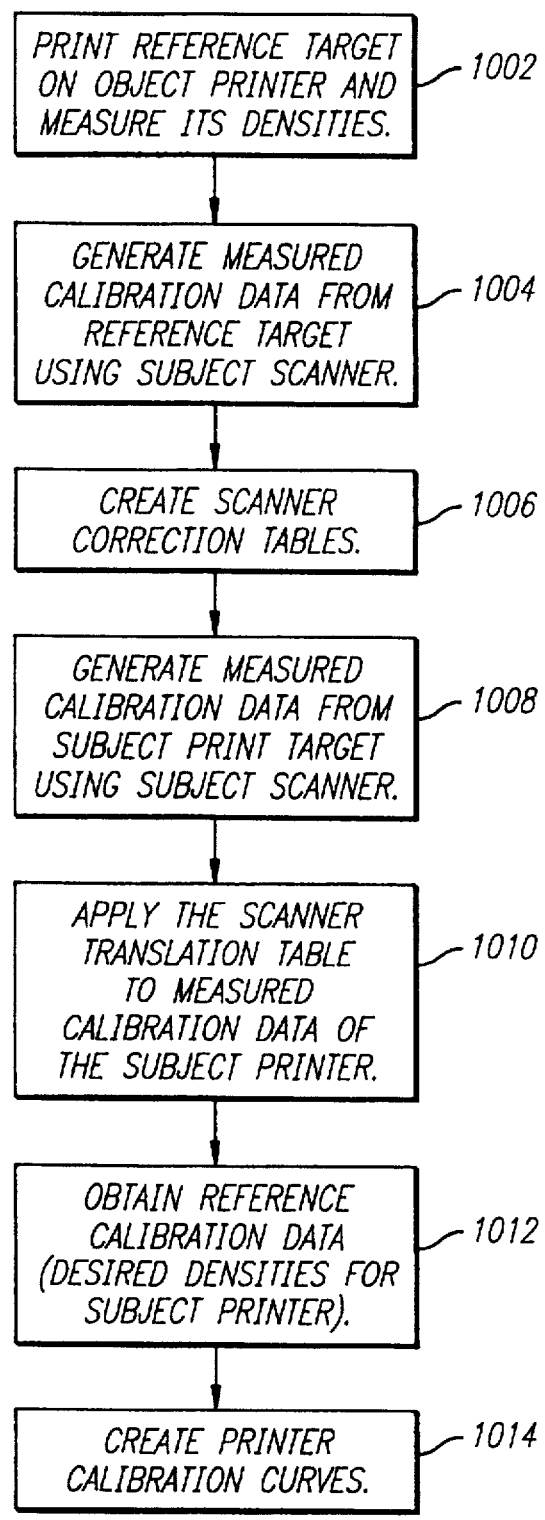
FIG. 10 is a flow diagram for calibrating a subject printer according to the second embodiment of the present invention.

FIG. 10 is a flow diagram illustrating the method of the second embodiment of the present invention using a C, M, Y, and K printer for the color reproduction device and an object densitometer for the object color measurement device. In step 1002, the object reference target is printed on the object printer 406 and the densities of the printer target are measured using the object densitometer to produce density values 1114 of the standard object reference target 1110. Step 1002 must be performed once for each standard object reference target, and object reference targets are provided for subject scanners and subject printers. When the standard target density values 1114 are encoded on the target itself, the density values 1114 are encoded either as bar codes or as characters on each standard object reference target 1110. Otherwise the target density values 1114 are provided as digital data. In step 1004, the subject scanner 412 generates measured calibration data comprising measured scan signals 1118 of the standard object reference target 1110. In step 1006, scanner correction tables 1122 are generated using the reference density data (densities 1114) and measured calibration data (measured scan signals 1118) from the object densitometer 1202 and subject scanner 412, respectively. In step 1008, the subject scanner 412 generates measured calibration data comprising measured scan signals 1130 of the subject printer colors. In step 1010, the scanner translation tables 1122 are applied to the measured calibration data (measured scan signals 1130 of subject printer colors) of the subject printer 416. In step 1012, the desired densities 1102 of the printer values are determined. In step 1014, printer calibration curves 1138 are created using the desired density values 1102 and the measured calibration data 1130 of the subject print target 326 after scanner translation (i.e., translated measured calibration data 1134).

FIGS. 11(*a*) and 11(*b*) are detailed flow diagrams illustrating the method of the second embodiment of the present invention. Referring to step 1002 of FIG. 10, a standard object reference target 1110 is provided to step 1112. In step 1112, the object scanner 402 scans the object reference target 1110 to produce reference scan signals 1114 of the standard object reference target colors. As described above with reference to FIG. 10, the reference scan signals 1114 of the standard target colors are generated for each target that is provided to users. The scan signals may be encoded on each target provided as digital data with each target. Referring to step 1004, the object reference target is provided to step 1116. In step 1116, the subject scanner 412 scans the object reference target 1110 to produce measured scan signals 1118 of the object reference target colors. Referring to step 1006, the reference density values 1114 of the standard target and measured scan signals 1118 of the standard target are provided to step 1120. In step 1120, the subject controller 414 performs piecewise linear interpolation and extrapolation on reference densities 1114 and measured scan signals 1118 to produce scanner translation tables 1122.

Referring to step 1008, the subject printer 416 prints single-ink patches using a digital target as input in step 1124 to produce a subject print target 1126. The subject print target 1126 is provided to step 1128. In step 1128, the subject scanner 412 scans the subject print target 1126 to produce measured scan signals 1130 of the subject printer colors. Referring to step 1010, the scanner translation tables 1122 and the measured scan signals 1130 of the subject printer colors are provided to step 1132. In step 1132, the subject controller 414 applies the scanner translation tables 322 to the calibration data of the subject printer 416 (i.e., the measured scan signals 1130 of the subject printer colors) to produce measured calibration data 1134 of the print target after scanner correction, calibration data 1134 comprises density values.

Referring to step 1012, the desired densities 1102 of the printer colors printed out in step 1124 are determined. Referring to step 1014, the desired densities 1102 of the printer colors and the measured calibration data 1134 of the print target after scanner translation are provided to step 1136. In step 1136, the subject controller 414 creates printer calibration curves 1138 using the desired densities 1102 of the printer colors and the measured calibration data 1134 of the print target after scanner translation. The printer calibration curves 1138 may be used to alter the rendering of color reproductions and other documents, thereby achieving a desired result.

The above flow diagrams illustrate an embodiment employing a densitometer for the object color measuring device 1202. In another embodiment, the flow diagrams are almost identical when using a colorimeter, however, CIE values are used instead of densities.

A Method of Measuring Colors for Overcoming Scanner Inaccuracies

In the method of the present invention for calibrating a subject printer using a subject scanner, inaccuracies occur due to inherent problems measuring color information using a scanner.

FIGS. 5A and 5B are perspective- and side-view diagrams illustrating a target 520 (e.g., target 702 of FIG. 7) disposed on a scanner 510 typical of the prior art. The target 520 is placed directly upon the glass plate 506 of the scanner 510 to be scanned. The scanner may comprise a scanner cover 504 as illustrated in FIGS. 5A and 5B. In FIG. 5B, the scanning head 508 is illustrated disposed below the bottom-most surface of glass plate 506 of scanner 510. As indicated by dashed-dotted line 502, the focal point 530 of scanning head 508 is located at the topmost surface of glass plate 506. The surface of target 520 that is to be scanned is placed upon glass plate 506; therefore, the scanning head 508 is focused on the surface of target 520.

Figure 8A:
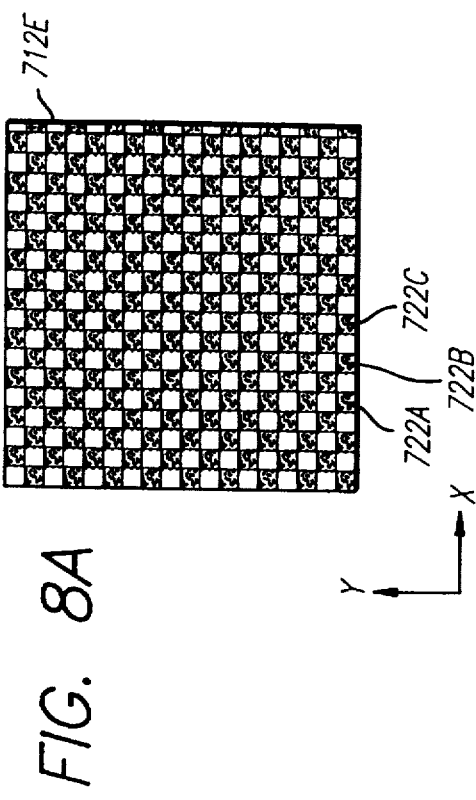
FIGS. 8A and 8B are diagrams illustrating a single patch and the densities of corresponding points in one direction according to the prior art.
Figure 8B:

A disadvantage of the prior art of scanning to measure color is indicated in FIGS. 8A and 8B. FIGS. 8A and 8B illustrate a single color patch 712E of target 702 (shown in FIG. 7) that is to be scanned and the densities of corresponding points of the patch 712E in one direction. Referring to FIG. 8A, patch 712E comprises a plurality points having some ink density (for example, a high ink density) and another plurality of points having little or no ink disposed upon them. For instance, points 722A, 722B, and 722C are points of high ink density with intervening points of no ink. FIG. 8B illustrates the ink density of points 722A, 722B, and 722C disposed at points X1, X2, and X3, respectively, along the horizontal (X) axis. FIG. 8B indicates the regions between points X1 and X2 and between X2 and X3 where there is zero ink density. Such a pattern may occur when patch 712E is printed in half-tone, for example, with a screen using a particular dot shape, screen frequency, and screen angle.

When measuring the color information comprising densities of color samples (e.g., patch 712E) generated by a printing device using prior art techniques, the prior art produces several effects that complicate obtaining accurate and consistent color readings.

The dynamic range of a scanner 510 (e.g., object scanner 402 or subject scanner 412 or both) is generally smaller than that of a printer (e.g., object printer 406 or subject printer 416 or both). Consequently, the scanner 510 may not accommodate measuring the entire range of ink densities that the printer is able to produce. For instance, the scanner 510 may be able to measure density level D0 but not level D1 illustrated in FIG. 8B.

Another effect complicating the process of obtaining accurate and consistent color readings using a scanner is due to the inherent resolution of the printing device. FIGS. 8A and 8B illustrate this inherent resolution (e.g., discrete points 722A, 722B, and 722C along the X axis). The patch 712E produced by a printer (e.g., object printer 406 or subject printers 416 or both) comprises a plurality of points. The inherent resolution of the printing device that generated the color samples to be measured may be close or identical to the inherent resolution of the scanner 510 for reading the color samples especially in a closed loop device such as color copiers. Consequently, a resolution conflict occurs that commonly manifests itself as interference patterns in the scanner signals of the image. Additionally, the scanner 510 is extremely sensitive to the positioning and orientation of the target 520 (702) during scanning.

Yet another effect complicating the process of obtaining robust color readings is that readings of the scanner 510 are often unreliable when measuring dark colors (e.g., patch 710A of FIG. 7). The unreliable readings are mainly due to the sensitivity responses of scanner 510. Such sensitivity responses are commonly linear with respect to luminance of the measured color. Therefore, the signal-to-noise ratio (SNR) of scanner readings for dark colors is lower than the signal-to-noise ratio of scanner readings for light colors, thus causing a higher variability.

A further effect complicating the process of obtaining robust color readings is that several printing processes vary spatially from point-to-point on a single print. For example, a printing process may vary spatially as a function of the surrounding printed values. These effects are especially noticeable when printing large continuous patches of colors having high densities.

Thus, it is clear that a need exists for an improved scanning technique for measuring color using a scanner to overcome disadvantages of the prior art.

Measuring Color Produced by a Printer Using a Scanner

The scanning method of the present invention provides improvements over the prior art for using a scanner to measure color information, since the present invention calibrates a subject printer using a scanner to measure color information in the output of the subject printer. That is, the present invention measures densities or colorimetric CIE values of color samples generated by a printing device. The improved scanning technique for measuring color information of the present invention provides an improved method for using a scanner to measure color in many applications in the field of color reproduction.

Defocused Scanner Measurements

In one embodiment of the present invention, the inaccuracies of measuring color information using a scanner are reduced by moving the location of the target away from the focal point of the scanner head. In particular, in the prior art, a target 520 is positioned on a scanner 510 essentially as disclosed in FIGS. 5A and 5B. In the present invention, however, the target 520 is disposed on scanner 510 away from the glass plate 506 so that the surface of the target 520 to be scanned is not located at the focal plane indicated by dashed-dotted line 502 of FIG. 5B. Plane 502 is either the locus of focal points of the scanner or the focal plane of a scanner with several read heads, and is referred to as the focal plane. The exact position of the target away from the focal point is determined by the pattern on patch 712E to be measures, and the focal point, depth of field, and resulting circle of confusion of scanner 510.

FIG. 6A is a side-view diagram illustrating the positioning of the target 520 according to the present invention. The target 520 is disposed within target holder 604. Target holder 604 including target 520 is positioned in approximately the same location illustrated in the prior art FIGS. 5A and 5B. In the present invention, however, the target 520 is suspended a distance ΔF above the focal plane 502. Dashed line 602 illustrates the plane of the target surface facing glass plate 506 to be scanned 520. The region 630 defined by the top surface of glass plate 506, the inner sides of target holder 604 (indicated by dotted lines), and the surface of target 520 facing glass plate 506 is a void. The height of void 630 is denoted by ΔF. Thus, the image disposed on target 520 is out-of-focus with respect to scanning head 508 of scanner 510.

FIG. 6B is a perspective diagram illustrating the positioning of target 520 with reference to FIG. 6A, shown from the bottom. In FIG. 6B, the diagram illustrating scanner 510 of FIG. 6A is simplified to illustrate the scanning head 508 with respect to focal plane 502. Similarly, while target 520 is disposed within target holder 604, target holder 604 is not shown in FIG. 6B to simplify the drawing. In FIG. 6B, the target 520 is suspended a distance ΔF above the focal plane 502. Thus, the plane 602 of the surface of target 520 facing glass plate 506 is elevated a distance ΔF above the focal plane 502 containing focal point 530. Thus, the image comprising nine patches disposed on target 520 is out-of-focus with respect to scanning head 508 of scanner 510.

FIG. 14 illustrates the embodiment of target holder 604. Target holder 604 consists of a base 1402 on which the print target 520 is placed face up, and a window matte frame 1404 having an opening 1406 and being of a material of thickness ΔF. A hinge 1408 is placed between one edge of window matte frame 1404 and a corresponding edge of base 1402. However, it should be apparent to a person skilled in the art that other means of coupling the window matte and the base without departing from the scope of the present invention. To use target holder 604, the window matte frame 1404 and base 1402 are separated with respect to each other and print target 520 is placed on base 1402 facing towards window matte frame 1404. Window matte frame 1404 is closed on base 1402 by moving in the direction of arrows 1410. This holds and stretches target 520 in place.

Figure 9A:
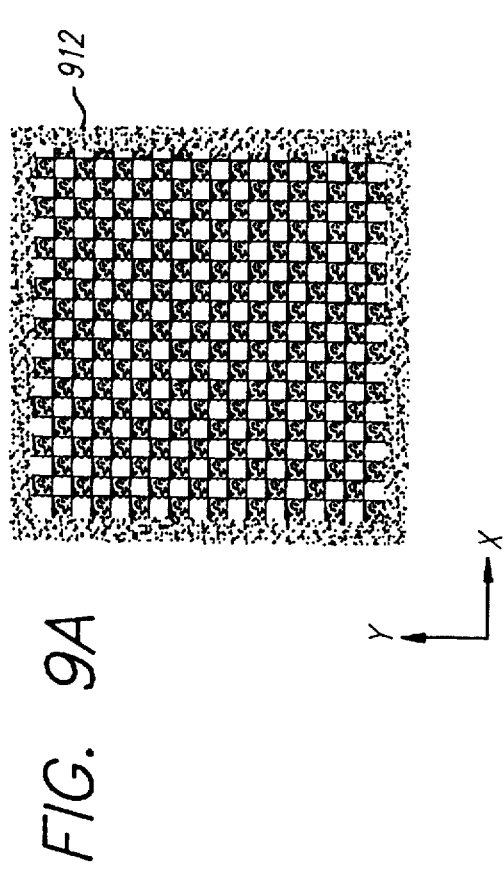
FIGS. 9A and 9B are diagrams illustrating the single patch and the densities of corresponding points in one direction according to the present invention.
Figure 9B:
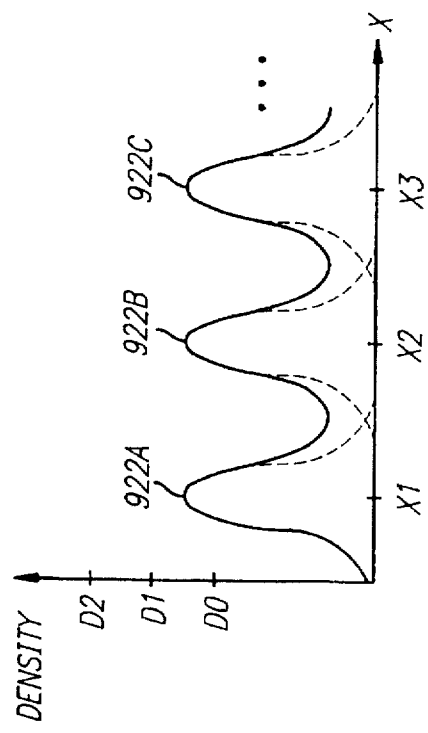

FIGS. 9A and 9B are diagrams illustrating a single patch 912 and the densities of corresponding points in one direction according to the present invention. FIGS. 9A and 9B of the present invention correspond to FIGS. 8A and 8B, respectively, where the target 520 is elevated at a distance ΔF above the focal plane 502. FIG. 9A illustrates an out-of-focus patch 912 corresponding to patch 712E of FIG. 8A. FIG. 9A demonstrates the effect of defocusing patch 712E of FIG. 8A. The pattern of discrete, point values in patch 712E are effectively smoothed between points, thereby providing a blurred version of patch 712E for sampling by scanner 510. This is equivalent to convolving patch 712E with the point response function of the defocused scanner 510 to give the blurred version. As indicated in FIG. 9B, the points 922A, 922B, and 922C of patch 912 corresponding to points 722A, 722B, and 722C, respectively, of patch 712E are smoothed to reduce the effects of any interference patterns that might occur between the scanner and the half tone pattern of patch 712E.

By effectively defocusing the scanner 510 (lifting the target 520 a small distance above the focal plane 502, the small distance ΔF depending on the depth of field and required circle of confusion), the target may also be printed at full ink density without the consequent disadvantages of the prior art including dynamic range limitations because the ink density of the target patches are fully controlled by the design of the patch. For example, a 50% dot is read at half its actual density value. Further, smaller patches may be printed since the small number of points used in a small patch may be superimposed by the convolution operation of defocusing, thereby reducing artifacts associated with large patches of the prior art. Still further, the larger number of small patches disposed on the target 520 allows the present invention to filter out noise in the scan signals of the scanner 510 by averaging the color values determined for patches having the same color.

When used for calibrating printers in the method of the present invention, the defocusing embodiment is designed in conjunction with the screen pattern (dot size, dot shape, screen angle, and screen frequency) of the half-tone patches to enable practical defocusing with a reasonable value of distance ΔF for a scanner/printer where the scanner has known focal properties.

Diffused Scanner Measurements

It may be that for a particular printer/scanner, even with control of the screen pattern (dot size and shape, and screen angle and frequency) of the half tone patches, the defocusing embodiment may not work because that scanner's depth of field is such that the distance ΔF required to achieve sufficient defocusing is not practical. In an alternate embodiment of the present invention, a diffusing substrate rather than defocusing means is placed in between a target comprising a plurality of single-ink patches and the scanning device. The scanning device for measuring ink density scans the target to produce a plurality of scan signals. As with the defocusing embodiment, diffusing the target overcomes prior art disadvantages of spatial correlation, thereby reducing significantly the undesired interference patterns.

FIG. 13 is a side-view diagram showing scanner 510 with a target 520 positioned on the scanner 510 but with a diffusing substrate 1302 disposed between the glass plate 506 and the surface of target 520 to be scanned.

In this manner, a method for calibrating a color printer using a scanner is disclosed.

We claim:

1. A method of calibrating a color reproduction device, comprising the steps of:

(a) scanning a standard target using a subject scanning means to generate a first plurality of color signals;

(b) obtaining a second plurality of color signals, said second plurality of color signals generated by an object measurement means using said standard target;

(c) creating scanner tables for said subject scanning means dependent on said first plurality of color signals and said second plurality of color signals;

(d) scanning a subject target using said subject scanning means to generate a third plurality of color signals;

(e) generating a fourth plurality of color signals using said third plurality of color signals and said scanner tables;

(f) obtaining a fifth plurality of color signals, said fifth plurality of color signals representing desired color signals; and, (g) creating calibration curves for a subject color reproduction device dependent on said fourth plurality of color signals and said fifth plurality of color signals.

2. The method of claim 1 wherein:

said standard target comprises a plurality of patches;

each patch of said plurality of patches simulates a single colorant;

said single colorant has a spectral characteristics similar to the spectral characteristic of a subject printer colorant.

3. The method of claim 2 wherein:

said plurality of patches simulates varying amounts of each colorant in a set of colorants wherein said set of colorants has spectral characteristics similar to the spectral characteristics of a set of subject printer colorants.

4. The method of claim 3 wherein said set of colorants comprises C, M, and Y colorants.

5. The method of claim 4 wherein said set of colorants further comprises K colorant.

6. The method of claim 2 wherein said subject target is produced by said subject color reproduction means dependent upon a digital target.

7. The method of claim 6 wherein each patch of said plurality of patches comprises a mixture of one or more standard colorants.

8. The method of claim 7 wherein said mixture of one or more standard colorants comprise a mixture of one or more PANTONE® pigments.

9. The method of claim 6 wherein said standard target is a reference target;

each patch of said plurality of patches comprises an object printer colorant;

said object printer colorant has spectral characteristic similar to the spectral characteristic of a subject printer colorant.

10. The method of claim 9 wherein said scanner tables are scanner translation tables.

11. The method of claim 6 wherein said subject target comprises a plurality of patches, each patch of said plurality of patches containing a single colorant.

12. The method of claim 6 wherein said fifth plurality of color signals is a second digital file.

13. The method of claim 1 wherein said object measurement means comprises an object scanning means.

14. The method of claim 13 wherein said fifth plurality of color signals is generated by said object scanning means and an object target.

15. The method of claim 14 wherein said object target is produced by an object color reproduction means dependent upon said digital target.

16. The method of claim 15 wherein said subject color reproduction means is of a same type of color reproduction means as said object color reproduction means.

17. The method of claim 14 wherein said object target comprises a plurality of patches, each patch of said plurality of patches containing a single colorant.

18. The method of claim 13 wherein said subject scanning means is of a same type of scanning means as said object scanning means.

19. The method of claim 1 wherein said scanner tables are scanner correction tables.

20. The method of claim 1 wherein said object measurement means comprises a densitometer.

21. The method of claim 1 wherein said object measurement means comprises a colorimeter.

22. The method of claim 1 wherein said second plurality of color signals is a first digital file.

23. A method of modifying reproduction means, comprising the steps of:

(a) generating first measured data of a standard target using a first scanning means;

(b) obtaining first reference data of said standard target;

(c) creating scanner tables for first color channels of said first scanning means;

(d) generating second measured data of a subject target using said first scanning means, said subject target produced by a first reproduction means;

(e) computing third measured data dependent on said second measured data and said scanner table;

(f) obtaining second reference data of an object target;

(g) modifying second color channels of said first reproduction means dependent on said second reference data and said third measured data.

24. The method of claim 23 wherein:

said standard target comprises a plurality of patches;

each patch of said plurality of patches simulates a single colorant;

said single colorant has a spectral characteristics similar to the spectral characteristic of a subject printer colorant.

25. The method of claim 24 wherein said plurality of patches simulates varying amounts of each colorant in a set of colorants wherein said set of colorants has spectral characteristics similar to the spectral characteristics of a set of subject printer colorants.

26. The method of claim 25 wherein each patch of said plurality of patches comprises a mixture of one or more standard colorants.

27. The method of claim 26 wherein said mixture of one or more standard colorants comprise a mixture of one or more PANTONE® pigments.

28. The method of claim 25 wherein said set of colorants comprises C, M, and Y colorants.

29. The method of claim 28 wherein said set of colorants further comprises K colorant.

30. The method of claim 24 wherein:

said standard target is a reference target;

each patch of said plurality of patches comprises an object printer colorant;

said object printer colorant has spectral characteristic similar to the spectral characteristic of a subject printer colorant.

31. The method of claim 30 wherein said first reference data is obtained by a densitometer.

32. The method of claim 30 wherein said second reference data is obtained by said densitometer measuring said object target.

33. The method of claim 30 wherein said first reference data is obtained by a colorimeter.

34. The method of claim 30 wherein said second reference data is obtained by said colorimeter measuring said object target.

35. The method of claim 30 wherein said second scanning means is calibrated.

36. The method of claim 30 wherein said standard target comprises said first reference data.

37. The method of claim 23 wherein said first reference data is obtained by a second scanning means.

38. The method of claim 37 wherein said second reference data is obtained by said second scanning means scanning said object target.

39. The method of claim 37 wherein said first scanning means is of a same type of scanning means as said second scanning means.

40. The method of claim 23 wherein said scanner tables are scanner correction tables.

41. The method of claim 23 wherein said scanner tables are scanner translation tables.

42. The method of claim 23 wherein said scanner tables are created using curve fitting dependent on said first measured data and said first reference data.

43. The method of claim 42 wherein curve fitting comprises linear regression.

44. The method of claim 42 wherein curve fitting comprises piecewise linear curve fitting.

45. The method of claim 23 wherein said subject target is dependent on a digital target.

46. The method of claim 23 wherein said object target is produced by a second reproduction means.

47. The method of claim 46 wherein said first reproduction means is a same type of reproduction means as said second reproduction means.

48. The method of claim 23 wherein said reference target comprises said second plurality of color signals.

49. A method of generating color signals using a scanning means, comprising the steps of:

(a) disposing a target on a scanning means, said target comprising a plurality of single-colorant patches;

(b) disposing a distortion means connected to said scanning means and to said target;

(c) generating a plurality of scan signals using said scanning means and distorting means, said plurality of scan signals dependent on said target.

50. The method of claim 49 wherein said distortion means defocuses said target.

51. The method of claim 49 wherein said distortion means diffuses said target.

52. The method of claim 49 wherein said plurality of single-colorant patches are randomly positioned on said target.

53. The method of claim 49 further including the step of generating at least one reference signal dependent using said first plurality of scan signals, said reference signal generated by averaging a second plurality of scan signals corresponding to a second plurality of patches wherein said second plurality of patches is less than or equal to said first plurality of patches.

* * * * *